United States Patent
Sung et al.

(10) Patent No.: US 10,351,128 B2
(45) Date of Patent: *Jul. 16, 2019

(54) VEHICLE AND METHOD FOR CONTROLLING THEREOF FOR COLLISION AVOIDANCE

(71) Applicant: HYUNDAI MOTOR COMPANY, Seoul (KR)

(72) Inventors: DongHyun Sung, Hwaseong-si (KR); Taeyoung Lee, Yongin-si (KR); Sangmin Lee, Seoul (KR); Eungseo Kim, Suwon-si (KR); Yongseok Kwon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 208 days.

This patent is subject to a terminal disclaimer.

(21) Appl. No.: 15/468,703

(22) Filed: Mar. 24, 2017

(65) Prior Publication Data
US 2018/0162387 A1  Jun. 14, 2018

(30) Foreign Application Priority Data
Dec. 8, 2016 (KR) .......................... 10-2016-0166663

(51) Int. Cl.
*G08G 1/16* (2006.01)
*B60W 30/09* (2012.01)
(Continued)

(52) U.S. Cl.
CPC ............ *B60W 30/09* (2013.01); *B60W 10/06* (2013.01); *B60W 10/184* (2013.01); *G08G 1/165* (2013.01);
(Continued)

(58) Field of Classification Search
CPC ............... B60W 30/09; B60W 30/095; B60W 2420/52; B60W 2550/10;
(Continued)

(56) References Cited

U.S. PATENT DOCUMENTS 6,856,906 B2  2/2005  Winner et al.
8,600,606 B2  12/2013  Nickolaou et al.
(Continued)

FOREIGN PATENT DOCUMENTS

| JP | 10-95291 A | 4/1998 |
|---|---|---|
| JP | 2004-268829 A | 9/2004 |
| JP | 2005-145282 A | 6/2005 |

OTHER PUBLICATIONS

Reddy et al., On board assistant to GPS navigation of vehicles, 2009, IEEE, p. 7-13 (Year: 2009).*

(Continued)

*Primary Examiner* — Mcdieunel Marc
(74) *Attorney, Agent, or Firm* — Morgan Lewis & Bockius LLP

(57) ABSTRACT

A vehicle and a method for controlling a vehicle detects an object for avoiding a collision between a vehicle and the object, based on a type of the object detected by the vehicle, and determining a risk of collision with the object. The vehicle includes an image capturer configured to detect an object by capturing the object around a vehicle, a sensor configured to acquire at least one of position information and speed information of the object, a controller configured to variably determine a detection target area based on the type of the detected object, configured to calculate a time to collision (TTC) between the vehicle and the object based on the at least one of position information and speed information of the object placed in the determined detection target area, and configured to transmit a signal to control a driving speed of the vehicle based on the calculated TTC, and a (Continued)

speed regulator configured to regulate the driving speed of the vehicle in response to the transmitted control signal.

14 Claims, 15 Drawing Sheets

(51) Int. Cl.
  *B60W 10/06* (2006.01)
  *B60W 10/184* (2012.01)
(52) U.S. Cl.
  CPC ......... *G08G 1/166* (2013.01); *B60W 2420/40* (2013.01); *B60W 2420/52* (2013.01); *B60W 2520/105* (2013.01); *B60W 2550/10* (2013.01); *B60W 2550/302* (2013.01); *B60W 2550/306* (2013.01); *B60W 2720/10* (2013.01)
(58) Field of Classification Search
  CPC ....... B60W 2720/106; B60W 30/0953; B60W 30/18163; B60W 2520/105; G08G 1/16
  See application file for complete search history.

(56) References Cited

U.S. PATENT DOCUMENTS

| | | | | |
|---|---|---|---|---|
| 2008/0036576 | A1* | 2/2008 | Stein | B60R 1/00 340/425.5 |
| 2012/0314071 | A1* | 12/2012 | Rosenbaum | B60W 30/0956 348/148 |
| 2014/0220513 | A1* | 8/2014 | Harkness | G09B 9/05 434/69 |
| 2015/0298692 | A1* | 10/2015 | Minemura | B60W 30/08 701/70 |
| 2016/0291134 | A1* | 10/2016 | Droz | G01S 7/4802 |
| 2017/0080929 | A1* | 3/2017 | Sawamoto | B60R 21/00 |
| 2017/0177955 | A1* | 6/2017 | Yokota | G06K 9/00791 |
| 2017/0276780 | A1* | 9/2017 | Takehara | G01S 7/006 |
| 2018/0162386 | A1* | 6/2018 | Lee | B60W 30/09 |
| 2018/0246187 | A1* | 8/2018 | Baba | G01S 7/415 |
| 2018/0251129 | A1* | 9/2018 | Ji | B60W 30/0953 |
| 2018/0253595 | A1* | 9/2018 | Aoki | G06T 7/60 |

OTHER PUBLICATIONS

Yoon et al., Development of augmented forward collision warning system for Head-Up Display, 2014, IEEE, p. 2277-2279 (Year: 2014).*

Zhu et al., A design of vehicle collision avoidance system based on DSP, 2009, IEEE, p. 530-534 (Year: 2009).*

Sergi et al., LIDAR-based vehicle tracking for a virtual mirror, 2003, IEEE, p. 333-338 (Year: 2003).*

Giri et al., Accounting for tire effect tin longitudinal vehicle control, 2009, IEEE, p. 3325-3330 (Year: 2009).*

Hisaka et al., On-board Wireless Sensor for Collision Avoidance: Vehicle and Pedestrian Detection at Intersection, 2011, IEEE, p. 198-205 (Year: 2011).*

* cited by examiner

VEHICLE AND METHOD FOR CONTROLLING THEREOF FOR COLLISION AVOIDANCE

CROSS-REFERENCE TO RELATED APPLICATION(S)

This application claims the benefit of priority to Korean Patent Application No. 10-2016-0166663, filed on Dec. 8, 2016 in the Korean Intellectual Property Office, the disclosure of which is incorporated herein by reference.

TECHNICAL FIELD

The present disclosure relates to a vehicle and a method for controlling thereof, and more particularly to a technology for variably setting an area, which is configured to detect an object for avoiding a collision between a vehicle and the object, based on a type of the object detected by the vehicle, and determining a risk of collision with the object.

BACKGROUND

A vehicle represents a variety of apparatuses configured to transport an object, such as people and goods, to a destination. The vehicle may be capable of moving to a variety of locations by using one and more wheels installed in a body of the vehicle. The vehicle may include three-wheeled, four-wheeled vehicle, a two-wheeled vehicle, such as a motorcycle, construction equipment, a bicycle or a train traveling on the rails disposed on the line.

In modern society, the vehicle has been the most common means of transportation, and the number of people using them has been increased. Due to the development of vehicle technology, there are also advantages, such as ease movement in the long distance and ease of life. However, the traffic congestion has been getting worse due to the deterioration of the road traffic in a high density area, e.g., South Korea.

In recent years, a research has been actively carried out for a vehicle equipped with an Advanced Driver Assist System (ADAS) that actively provides information about the vehicle condition, the driver condition, and the surrounding environment in order to reduce the burden on the driver and improve the convenience.

An example of advanced driver assistance systems that are mounted on the vehicle includes a Forward Collision Avoidance (FCA) system, and an Autonomous Emergency Brake (AEB) system. The Forward Collision Avoidance (FCA) system and the Autonomous Emergency Brake (AEB) system may be operated by determining a risk of collision with a counter vehicle or a crossing vehicle and by performing an emergency braking in a collision situation.

In order to implement the collision avoidance system, it may be required to detect an object in front of the vehicle and acquire information of the object by using a sensor provided in the vehicle, and in recent, the need for technology has emerged for determining the type of object in advance, for setting only area in which the object is placed, as a detection area.

SUMMARY

Therefore, it is an aspect of the present disclosure to provide a vehicle and a method for controlling thereof that can avoid a collision with an object by variably setting an area, which is configured to detect the object for avoiding a collision between the vehicle and the object, based on a type of the detected object and by determining a risk of collision with the object.

Additional aspects of the present disclosure will be set forth in part in the description which follows and, in part, will be obvious from the description, or may be learned by practice of the present disclosure.

In accordance with one aspect of the present disclosure, a vehicle includes: an image capturer configured to detect an object by capturing the object around a vehicle; a sensor configured to acquire at least one of position information and speed information of the object; a controller configured to variably determine a detection target area based on the type of the detected object, configured to calculate a time to collision (TTC) between the vehicle and the object based on the at least one of position information and speed information of the object placed in the determined detection target area, and configured to transmit a signal to control a driving speed of the vehicle based on the calculated TTC; and a speed regulator configured to regulate the driving speed of the vehicle in response to the transmitted control signal.

The controller may determine the detection target area based on at least one of a speed of transverse movement and a speed of longitudinal movement based on the type of the detected object.

The controller may determine an area of the detection target area based on at least one of the speed of transverse movement and the speed of longitudinal movement based on the type of the detected object.

The controller may calculate the TTC between the vehicle and the object based on the at least one of position information and speed information of the object placed in the determined detection target area.

The controller may calculate the TTC between the vehicle and the object based on at least one of the speed of transverse movement and the speed of longitudinal movement of the object placed in the determined detection target area.

The controller may determine an amount of deceleration of the vehicle based on the calculated TTC.

The controller may control the speed regulator so that the driving speed of the vehicle is reduced based on the determined amount of deceleration of the vehicle.

The object may include at least one of a target vehicle, a pedestrian and a bicycle placed in front of the vehicle.

The sensor may include any one of a radar and a Light Detection And Ranging (LiDAR).

In accordance with another aspect of the present disclosure, a method for controlling a vehicle includes: detecting an object around a vehicle; variably determining a detection target area based on the type of the detected object; calculating a time to collision (TTC) between the vehicle and the object based on at least one of position information and speed information of the object placed in the determined detection target area; transmitting a signal to control a driving speed of the vehicle based on the calculated TTC; and regulating the driving speed of the vehicle in response to the transmitted control signal.

The determination of the detection target area may include determining the detection target area based on at least one of a speed of transverse movement and a speed of longitudinal movement based on the type of the detected object.

The determination of the detection target area may include determining an area of the detection target area based on at least one of the speed of transverse movement and the speed of longitudinal movement based on the type of the detected object.

The calculation of the TTC between the vehicle and the object may include calculating a TTC between the vehicle and the object based on the at least one of position information and speed information of the object placed in the determined detection target area.

The calculation of the TTC between the vehicle and the object may include calculating a TTC between the vehicle and the object based on at least one of the speed of transverse movement and the speed of longitudinal movement the object placed in the determined detection target area.

The control of the driving speed of the vehicle may include determining an amount of deceleration of the vehicle based on the calculated TTC.

The control of the driving speed of the vehicle may include allowing the driving speed of the vehicle to be reduced based on the determined amount of deceleration of the vehicle.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
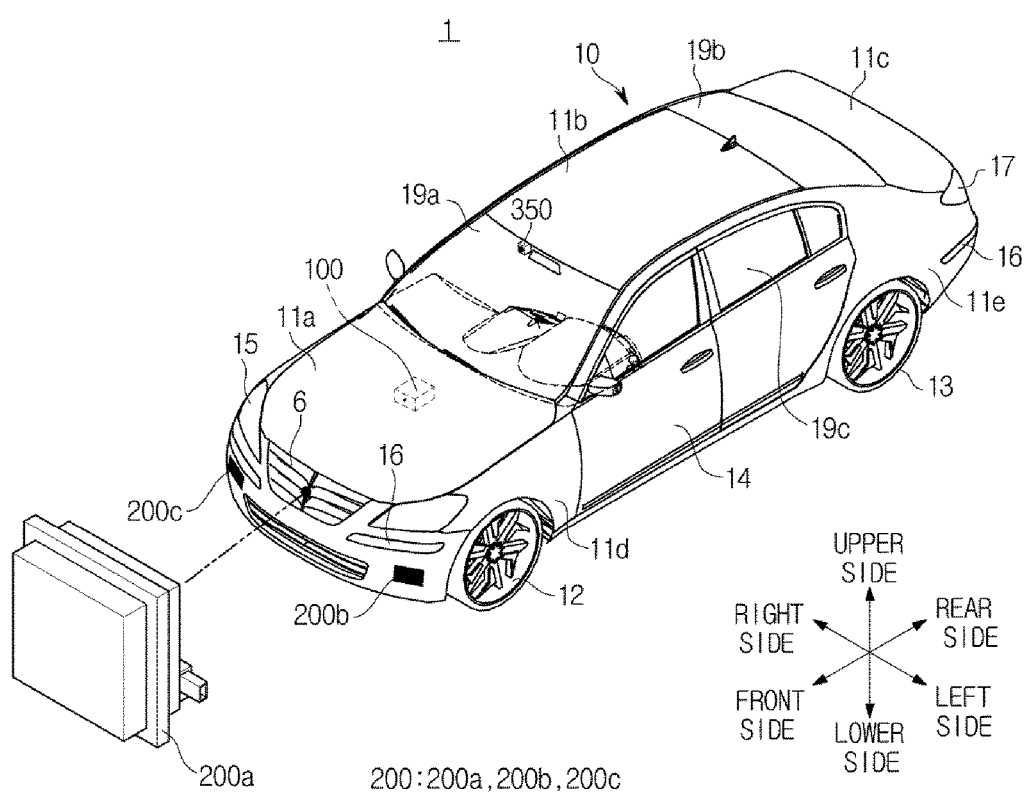
FIG. 1 is a perspective view schematically illustrating an appearance of a vehicle according to an embodiment of the present disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

Figure 2:
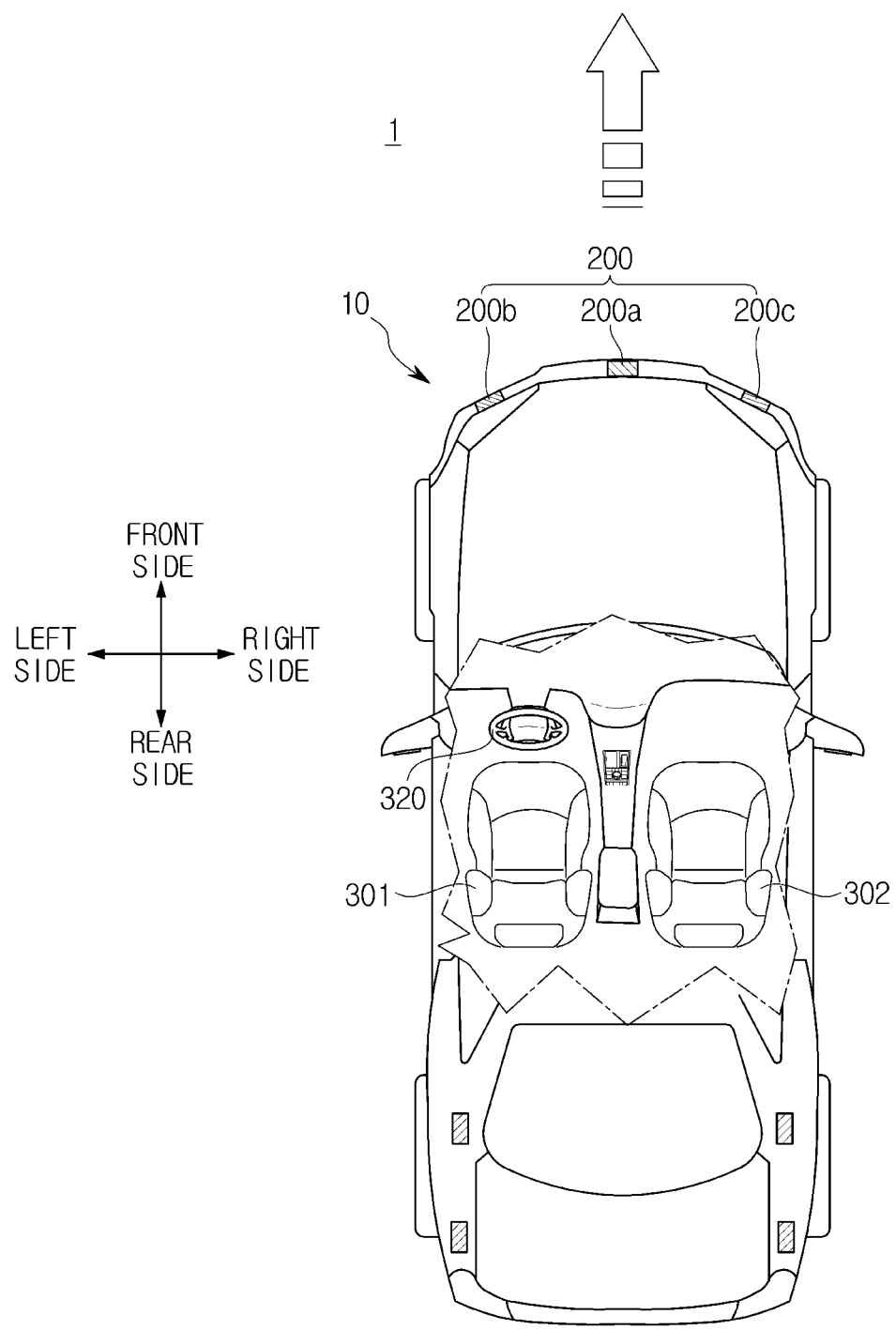
FIG. 2 is a view illustrating the vehicle provided with a sensor according to the embodiment.
Figure 3:
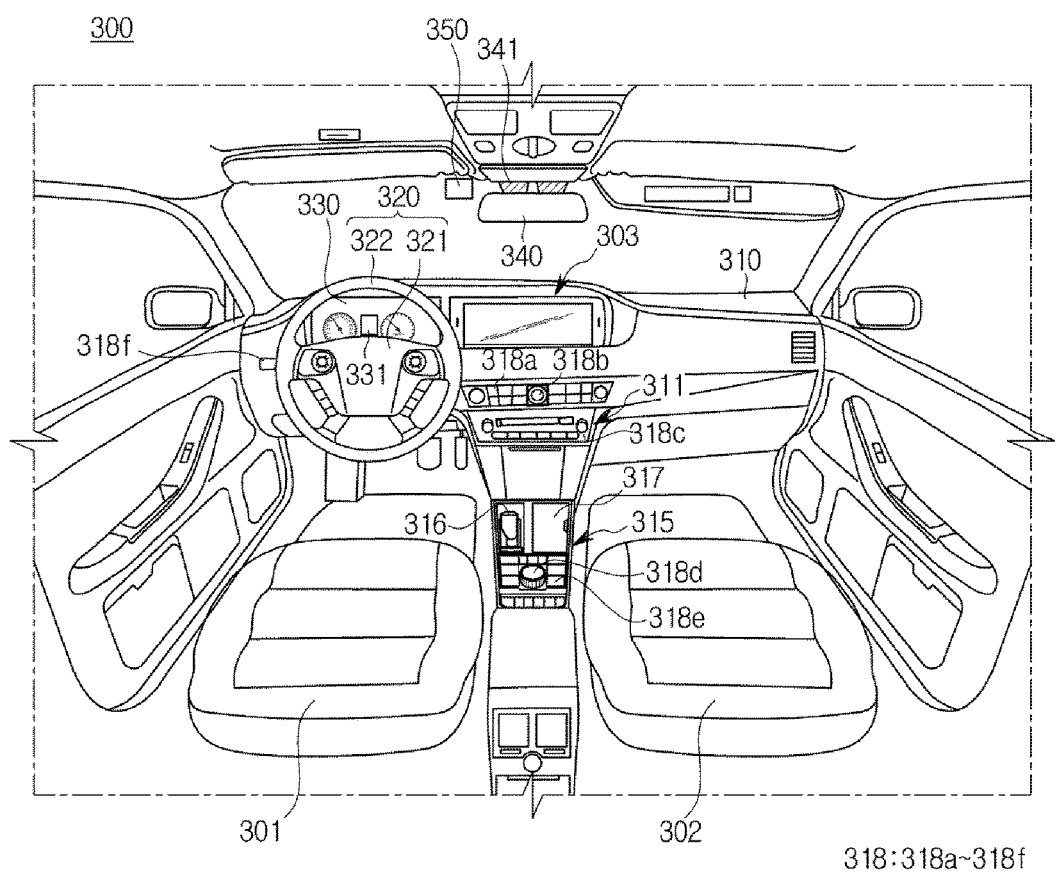
FIG. 3 is a view illustrating an interior structure of the vehicle according to the embodiment.
Figure 4:
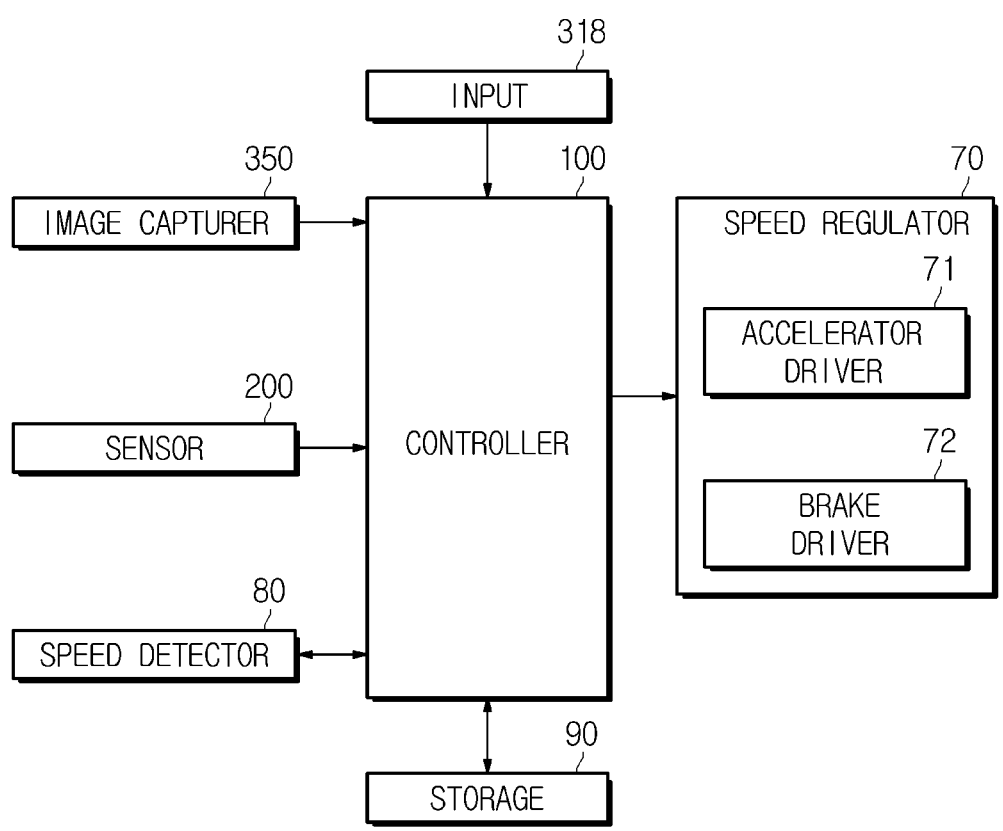
FIG. 4 is a control flow diagram illustrating the vehicle according to the embodiment.

FIG. 1 is a perspective view schematically illustrating an appearance of a vehicle according to an embodiment of the present disclosure. FIG. 2 is a view illustrating the vehicle provided with a sensor according to the embodiment, FIG. 3 is a view illustrating an interior structure of the vehicle according to the embodiment, and FIG. 4 is a control flow diagram illustrating the vehicle according to the embodiment.

Hereinafter for convenience of description, as illustrated in FIG. 1, a direction in which a vehicle moves forward may be defined as the front side, and the left direction and the right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as the rear side. A bottom direction with respect to the vehicle 1 may be defined as the lower side and a direction opposite to the lower side may be defined as the upper side. A surface disposed in the front side may be defined as a front surface, a surface disposed in the rear side may be defined as a rear surface, and a surface disposed in the lateral side may be defined as a side surface. A side surface in the left direction may be defined as a left side surface and a side surface in the right direction may be defined as a right side surface.

Referring to FIG. 1, the vehicle 1 may include a body 10 forming an exterior of the vehicle 1, and a vehicle wheel 12 and 13 moving the vehicle 1.

The body 10 may include a hood 11a protecting a variety of devices, which are needed to drive the vehicle 1, e.g., an engine, a roof panel 11b forming an inner space, a trunk lid 11c provided with a storage space, a front fender 11d and a quarter panel 11e provided on the side surface of the vehicle 1. In addition, a plurality of doors 14 hinge-coupled to the body 10 may be provided on the side surface of the body 11.

Between the hood 11a and the roof panel 11b, a front window 19a may be provided to provide a view of the front side of the vehicle 1, and between the roof panel 11b and the trunk lid 11c, a rear window 19b may be provided to provide a view of the rear side of the vehicle 1. In addition, on the upper side of the door 14, a side window 19c may be provided to provide a view of the lateral side.

On the front side of the vehicle 1, a headlamp 15 emitting a light in a driving direction of the vehicle 1 may be provided.

On the front and rear side of the vehicle 1, a turn signal lamp 16 indicating a driving direction of the vehicle 1 may be provided.

The vehicle 1 may display a driving direction by flashing the turn signal lamp 16. On the rear side of the vehicle 1, a tail lamp 17 may be provided. The tail lamp 17 may be provided on the rear side of the vehicle 1 to display a gear shifting state and a brake operating state of the vehicle 1.

As illustrated in FIGS. 1 to 3, in the vehicle 1, at least one image capturer 350 may be provided. The image capturer 350 may be a camera, an image sensor on any hardware device to capture an image of an object. The image capturer 350 may capture images around the vehicle 1 during the vehicle 1 drives or stops, detect an object around the vehicle 1, and further acquire the type of the object and position information of the object. The object captured around the vehicle 1 may include another vehicle, a pedestrian, and a bicycle, and further include a moving object or a variety of stationary obstacles.

The image capturer 350 may capture an object around the vehicle 1 and detect the type of the object by identifying the shape of the captured object via image recognition, and transmit the detected information to a controller 100.

Figure 5:
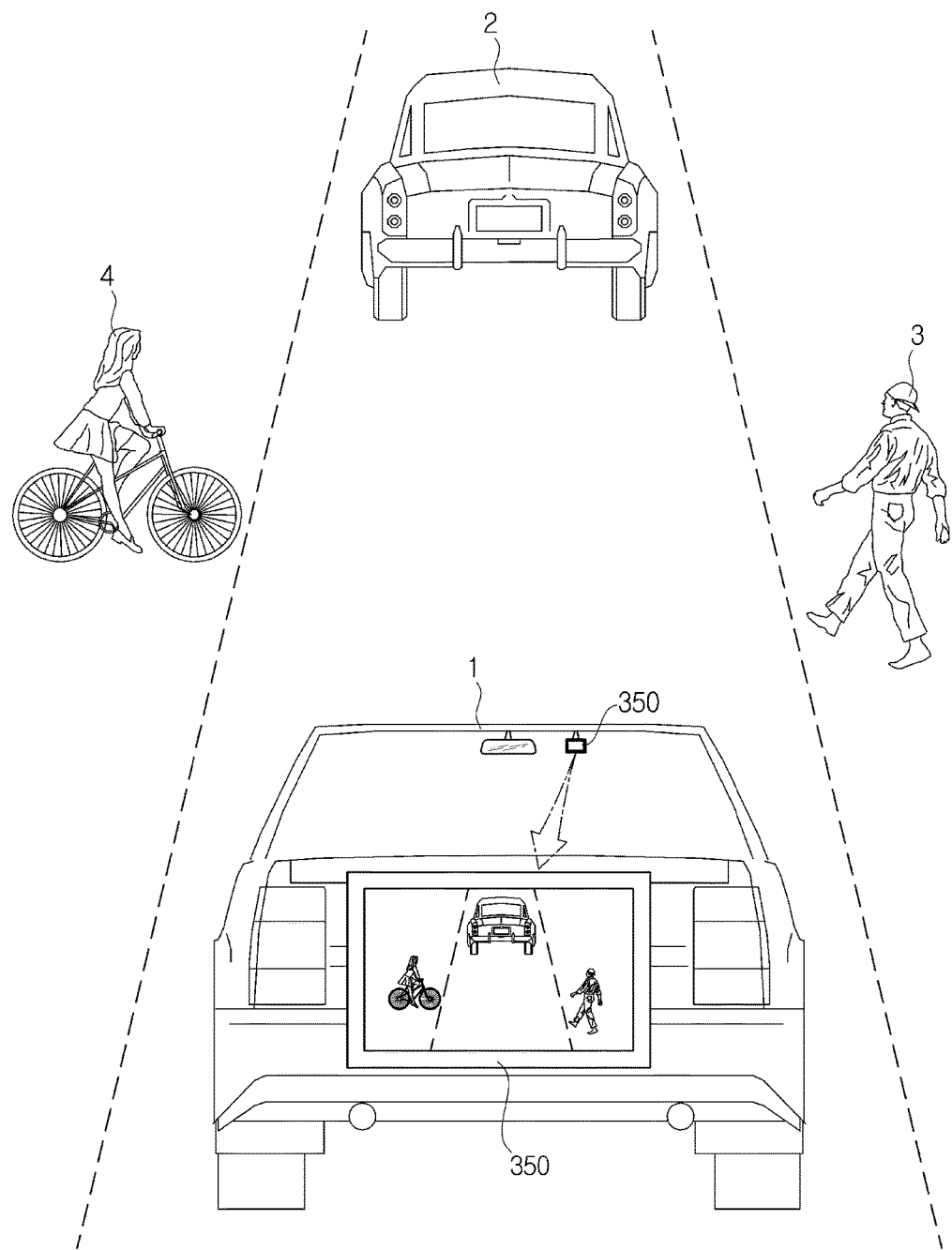
FIG. 5 is a view illustrating a case in which an image capturer detects an object around the vehicle according to an embodiment of the present disclosure.

FIG. 5 is a view illustrating a case in which an image capturer 350 detects an object around the vehicle according to an embodiment of the present disclosure.

As illustrated in FIG. 5, the image capturer 350 may capture at least one object in front of the vehicle 1 during the vehicle 1 drives, and determine whether the captured object is another vehicle 2, a pedestrian 3, or a moving bicycle 4. That is, among the object moving around the vehicle 1, the vehicle 2 may drive in the front side or the lateral side of the vehicle 1 or the pedestrian 3 or the bicycle 4 may move in the front side or the lateral side of the vehicle 1 in a longitudinal direction or a transverse direction with respect to the driving direction of the vehicle 1.

The image capturer 350 may determine the type of the object around the vehicle 1 based on the captured image, and transmit information related to the type of the determined object to the controller 100.

FIG. 3 illustrates that the image capturer 350 is provided adjacent to a room mirror 340, but is not limited thereto. Therefore, the image capturer 350 may be mounted to any position as long as capable of acquiring image information by capturing the inside or the outside of the vehicle 1.

The image capturer 350 may include at least one camera, and particularly include a three dimension (3D) space recognition sensor, a radar sensor, an ultrasonic wave sensor for capturing a precious image.

The 3D space recognition sensor may employ a KINECT (RGB-D sensor), a structured light sensor (time of flight (TOF) sensor) or a stereo camera, but is not limited thereto. Therefore, any other device having a similar function as the above mentioned function may be included.

The image capturer 350 may determine the type of the object around the vehicle 1 by capturing an image about the object around the vehicle 1 and acquire coordinate information of the captured object with respect to the vehicle 1. The image capturer 350 may transmit the coordinate information of the captured object to the controller 100.

Since the object moves around the vehicle 1, the coordinate and the moving speed of the object may be changed in real time, and since the vehicle 1 moves, the position and the speed of the vehicle 1 may be changed in real time. When the object moves, the image capturer 350 may detect the object by capturing an image about the object in real time.

The type and the position information of the object captured by the image capturer 350 may be stored in a storage 90 and used for the controller 100 to variably determine a detection target area for avoiding the collision based on the type of the detected object.

Referring to FIGS. 1 and 2, in the vehicle 1, a sensor 200 configured to detect an object in front of the vehicle and acquire at least one of position information or driving speed information of the detected object.

Figure 6:
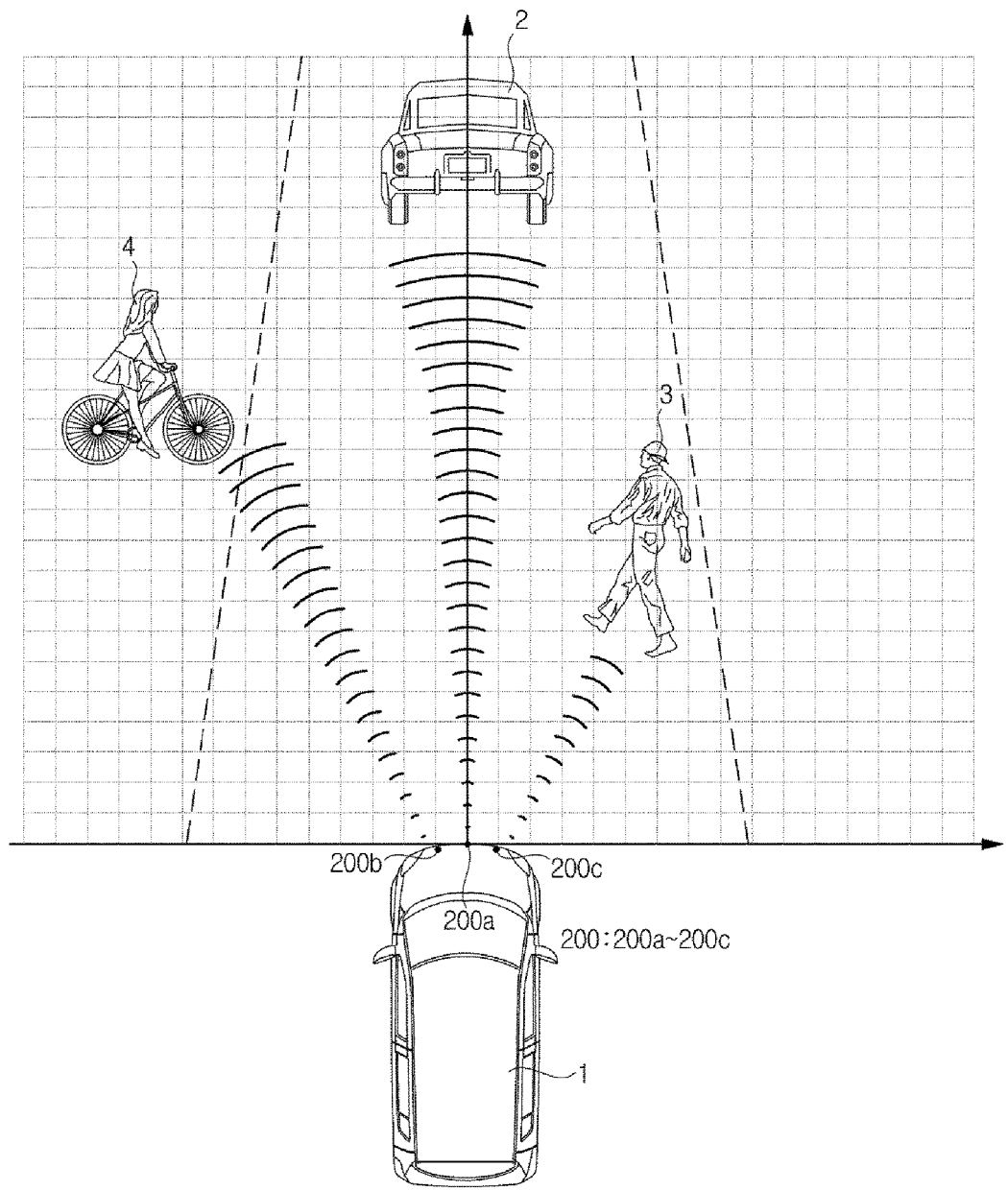
FIG. 6 is a view illustrating a case in which a detector acquires at least one of position information and speed information about an object around the vehicle according to an embodiment of the present disclosure.

FIG. 6 is a view illustrating a case in which a detector acquires at least one of position information and speed information about an object around the vehicle according to an embodiment of the present disclosure.

The sensor 200 according to the embodiment may acquire coordinate information of an object around the vehicle 1 with respect to the vehicle 1. That is, the sensor 200 may acquire coordinate information, which is changed according to the movement of the object, in real time, and may detect a distance between the vehicle 1 and the object.

Referring to FIG. 6, the sensor 200 may acquire position information of the vehicle 2, the pedestrian 3 and the bicycle 4 all of which are placed in front of the vehicle 1, and acquire coordinate information, which is changed according to the movement of the vehicle 2, the pedestrian 3 and the bicycle 4, in real time. The sensor 200 may detect a distance between the vehicle 1 and the object based on the coordinate information about the object.

The sensor 200 may acquire speed information about a moving speed of the object around the vehicle 1. Referring to FIG. 6, the sensor 200 may acquire information related to a speed of longitudinal movement and a speed of transverse movement of the vehicle 2, the pedestrian 3 and the bicycle 4.

As mentioned later, the controller 100 may calculate a relative distance between the vehicle 1 and the object and a relative speed between the vehicle 1 and the object by using position information and speed information of the object acquired by the sensor 200, and calculate a time to collision (TTC) between the vehicle 1 and the object.

As illustrated in FIGS. 1 and 2, the sensor 200 may be installed in a position that is appropriate to recognize an object, e.g. another vehicle, in the front, lateral or front lateral side. According to the embodiment, the sensor 200 may be installed in all of the front, the left and the right side of the vehicle 1 to recognize an object in all of the front side of the vehicle 1, a direction between the left side and the front side (hereinafter referred to as "left front side") of the vehicle 1 and a direction between the right side and the front side (hereinafter referred to as "right front side") of the vehicle 1.

For example, a first sensor 200a may be installed as a part of a radiator grill 6, e.g., inside of the radiator grill 6, or alternatively the first sensor 200a may be installed in any position of the vehicle 1 as long as capable of detecting another vehicle in the front side. A second sensor 200b may be installed in the left side surface of the vehicle 1, and a third sensor 200c may be installed in the right side surface of the vehicle 1.

The sensor 200 may determine whether another vehicle is present or is approaching in the left side, the right side, the front side, the rear side, the left front side, the right front side, the left rear side, or the right rear side, by using electromagnetic waves or laser light. For example, the sensor 200 may emit electromagnetic waves, e.g., microwaves or millimeter waves, pulsed laser light, ultrasonic waves, or infrared light, in the left side, the right side, the front side, the rear side, the left front side, the right front side, the left rear side, or the right rear side, receive pulsed laser light, ultrasonic waves, or infrared light, which are reflected or scatted by an object in the direction, and determine whether the object is placed. In this case, the sensor 200 may further determine a distance between the vehicle 1 and another object or a speed of another moving object, by using a return time of the radiated electromagnetic waves, pulsed laser light, ultrasonic waves, or infrared light.

According to the embodiment, the sensor 200 may determine the presence of the object by receiving visible light that is reflected or scattered by the object in the left side, the right side, and the front side. As mentioned above, a recognition distance to another object placed in the front or rear side may vary according to using which one of the electromagnetic waves, the pulsed laser light, the ultrasonic waves, the infrared light or the visible light, and the weather or illumination may affect determining the presence of the object.

By using this, when the vehicle 1 drives in a certain direction along a certain lane, the controller 100 of the vehicle 1 may determine whether another object, which is moving while being present in the front side, the left front side and the right front side of the vehicle 1, is present or not, and acquire position information and speed information of the object.

The sensor 200 may be implemented by using a variety of devices, e.g., a radar using millimeter waves or microwaves, a Light Detection And Ranging (LiDAR) using pulsed laser light, a vision sensor using visible light, an infrared sensor using infrared light, or an ultrasonic sensor using ultrasonic waves. The sensor 200 may be implemented by using any one of the radar, the Light Detection And Ranging (LiDAR), the vision sensor, the infrared sensor, or the ultrasonic sensor or by combining them. When a plurality of sensors 200 is provided in a single vehicle 1, each of the sensor 200 may be implemented by using the same type of sensor or the different type of sensor. The implementation of the sensor 200 is not limited thereto, and the sensor 200 may be implemented by using a variety of devices and a combination thereof which is considered by a designer.

Referring to FIG. 3, in an interior 300 of the vehicle, a driver seat 301, a passenger seat 302, a dashboard 310 and a steering wheel 320, and an instrument panel 330 may be provided.

The dashboard 310 may represent a panel configured to divide the inside of vehicle 1 into the interior of the vehicle 1 and an engine compartment, and in which a variety of components required for the driving is installed. The dashboard 310 may be provided in the front side of the driver seat 301 and the passenger seat 302. The dashboard 310 may include an upper panel, a center fascia 311 and a gear box 315.

In the upper panel of the dashboard 310, a display 303 may be installed. The display 303 may provide a variety of information to a driver or a passenger of the vehicle 1, as an image. For example, the display 303 may visually provide a variety of information, e.g., a map, weather, news, a variety of moving images or still images, and a variety of information related to conditions or operation of the vehicle 1, e.g., information about an air conditioning device. Further, the display 303 may provide a warning according to the risk, to the driver or the passenger. Particularly, when the vehicle 1 changes its lane, the display 303 may provide a warning to the driver, which varies according to the risk. The display 303 may be implemented by using a navigation system that is commonly used.

The display 303 may be installed in a housing that is integrally formed with the dashboard 310 to allow a display panel to be exposed to the outside. The display 303 may be installed in the center portion or a lower end of the center fascia 311, an inner surface of a windshield (not shown), or an upper surface of the dashboard 310, wherein the display 303 may be installed in the upper surface of the dashboard 310 by using a supporter (not shown). Alternatively, the display 303 may be installed in a variety of positions considered by the designer.

In the dashboard 310, a variety of devices, e.g., a processor, a communication module, a GPS reception module, and a storage, may be installed. The processor installed in the vehicle 1 may be configured to control electronics installed in the vehicle 1, and as mentioned above, the processor may be provided to perform functions of the controller 100. The above mentioned devices may be implemented by using a variety of components, e.g., semiconductor chips, switches, integrated circuits, resistors, volatile or non-volatile memory or printed circuit boards.

The center fascia 311 may be provided in the center of the dashboard 310 and may be provided with an input 318a to 318c for inputting a variety of commands related to the vehicle. The input 318a to 318c may be implemented using a physical button, a knob, a touch pad, a touch screen, a stick-type operator or a track ball. The driver may control the various operations of the vehicle 1 by operating the input 318a to 318c.

The gear box 315 may be provided between the driver seat 301 and the passenger seat 302 in the lower end of the center fascia 311. In the gearbox 315, a gear 316, a console 317, and various inputs 318d 318e may be provided. The input 318d to 318e may be implemented using a physical button, a knob, a touch pad, a touch screen, a stick-type operator or a track ball. The console 317 and the input 318d to 318e may be omitted according to the embodiment.

The steering wheel 320 and the instrument panel 330 may be provided in the direction of the driver seat in the dashboard 310.

The steering wheel 320 may be rotatable in a certain direction according to an operation of the driver, and the front vehicle wheel or the rear vehicle wheel of the vehicle 1 may be rotated according to the rotation direction of the steering wheel 320 so that the vehicle 1 is steered. In the steering wheel 320, a spoke 321 connected to a rotational shift and a handle wheel 322 coupled to the spoke 321 may be provided. In the spoke 321, an input means may be installed for inputting a variety of commands, and the input means may be implemented using a physical button, a knob, a touch pad, a touch screen, a stick-type operator, or a track ball. The handle wheel 322 may have a circular shape for the convenience of the driver, but is not limited thereto. A vibrator may be provided inside at least one of the spoke 321 and the handle wheel 322 and then the at least one of the spoke 321 and the handle wheel 322 may be vibrated with a certain intensity according to an external control. According to the embodiment, the vibrator 201 may be vibrated with various intensities in response to an external control signal, and thus the at least one of the spoke 321 and the handle wheel 322 may be vibrated with various intensities in response to the external control signal. The vehicle 1 may provide a haptic warning to the driver by using the vibrator 201. For example, the at least one of the spoke 321 and the handle wheel 322 may be vibrated with an intensity corresponding to a risk, which is determined when the vehicle 1 changes its lane, so as to provide a variety of warnings to the driver. Particularly, as the risk is higher, the at least one of the spoke 321 and the handle wheel 322 may be strongly vibrated so as to provide a high level warning to the driver.

In the rear side of the steering wheel 320, a turn signal indicator input 318f may be provided. A user may input a signal to change a driving direction or a lane via the turn signal indicator input 318f during driving the vehicle 1.

The instrument panel 330 may be configured to provide a variety of information related to the vehicle to the driver, wherein the variety of information may include a speed of the vehicle 1, an engine speed, fuel residual amount, a temperature of engine oil or whether the turn signal indicator is flashed or not. The instrument panel 330 may be implemented using an illumination lamp or a scale plate or may be implemented using a display panel according to embodiments. When the instrument panel 330 is implemented using the display panel, the instrument panel 330 may display more various information, e.g., fuel consumption, whether various devices mounted on the vehicle 1 are performed or not, as well as the above mentioned information, for the driver. According to the embodiment, the instrument panel 330 may output various warnings to the driver according to the risk of the vehicle 1. Particularly, the instrument panel 330 may provide various warnings to the driver according to the determined risk when the vehicle 1 changes a lane.

Referring to FIG. 4, according to an embodiment, the vehicle 1 may include a speed regulator 70 configured to regulate a driving speed of the vehicle 1 driven by the driver, a speed detector 80 configured to detect a driving speed of the vehicle 1, the storage 90 configured to store data related to the control of the vehicle 1, and the controller 100 configured to control each component of the vehicle 1 and the driving speed of the vehicle 1.

The speed regulator 70 may regulate a speed of the vehicle 1 driven by a driver. The speed regulator 70 may include an accelerator driver 71 and a brake driver 72.

The accelerator driver 71 may increase a speed of the vehicle 1 by driving the accelerator in response to a control signal of the controller 100, and the brake driver 72 may reduce a speed of the vehicle 1 by driving the brake in response to a control signal of the controller 100.

The controller 100 may increase or reduce the driving speed of the vehicle 1 so that a distance between the vehicle 1 and another object is increased or reduced based on a distance between the vehicle 1 and another object and a predetermined reference distance stored in the storage 90.

In addition, the controller 100 may calculate the TTC between the vehicle 1 and the object based on the relative distance and the relative speed between the vehicle 1 and the object, and transmit a signal, which is configured to control a driving speed of the vehicle 1 based on the calculated TTC, to the speed regulator 70.

The speed regulator 70 may regulate the driving speed of the vehicle 1 under the control of the controller 100, and may reduce the driving speed of the vehicle 1 when the risk of collision between the vehicle 1 and another object is high.

The speed detector 80 may detect a driving speed of the vehicle 1 driven by the driver under the control of the controller 100. That is, the speed detector 80 may detect the driving speed of the vehicle 1 by using the rotation speed of the vehicle wheel, and the unit of the driving speed may be expressed as [kph], and a moving distance per unit time (h) may be expressed as (km).

The storage 90 may store a variety of data related to the control of the vehicle 1. Particularly, the storage 90 may store information related to the driving speed, the driving distance and the driving time and driving information about the vehicle 1 according to the embodiment, and store the type and position information of an object detected by the image capturer 350.

The storage 90 may store position information and speed information of the object detected by the sensor 200, coordinate information of moving object that is changed in real time, and information about the relative distance and the relative speed between the vehicle 1 and the object.

In addition, the storage 90 may store data related to an equation and a control algorithm to control the vehicle 1 according to the embodiment, and the controller 100 may transmit a control signal to control the vehicle 1 according to the equation and the control algorithm.

The storage 90 may be implemented by using at least one of a non-volatile memory element, e.g., a cache, a Read Only Memory ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage 90 is not limited thereto. The storage 90 may be a memory that is implemented by a separate memory chip from the aforementioned processor related to the controller 100 or the storage 90 may be implemented by a processor and a single chip.

Referring to FIGS. 1 to 4 again, at least one controller 100 may be provided in the vehicle 1. The controller 100 may perform an electronic control about each component related to the operation of the vehicle 1.

The controller 100 may determine a detection target area that is variable based on the type of the object detected by the sensor 200 and the image capturer 350.

The detection target area may represent an area that is determined to apply a series of collision avoidance algorithms to detect an object to avoid the collision in a state in which the controller 100 is configured to calculate the TTC by calculating the relative distance and the relative speed between the vehicle 1 and the object to prevent the vehicle 1 from colliding with the object placed in front of the vehicle 1 during the vehicle 1 drives.

The controller 100 may variably determine a detection target area based on the type of the detected object, and calculate the TTC between the vehicle 1 and the object based on at least one of position information and speed information of the object that is placed in the determined detection target area.

Figure 7:
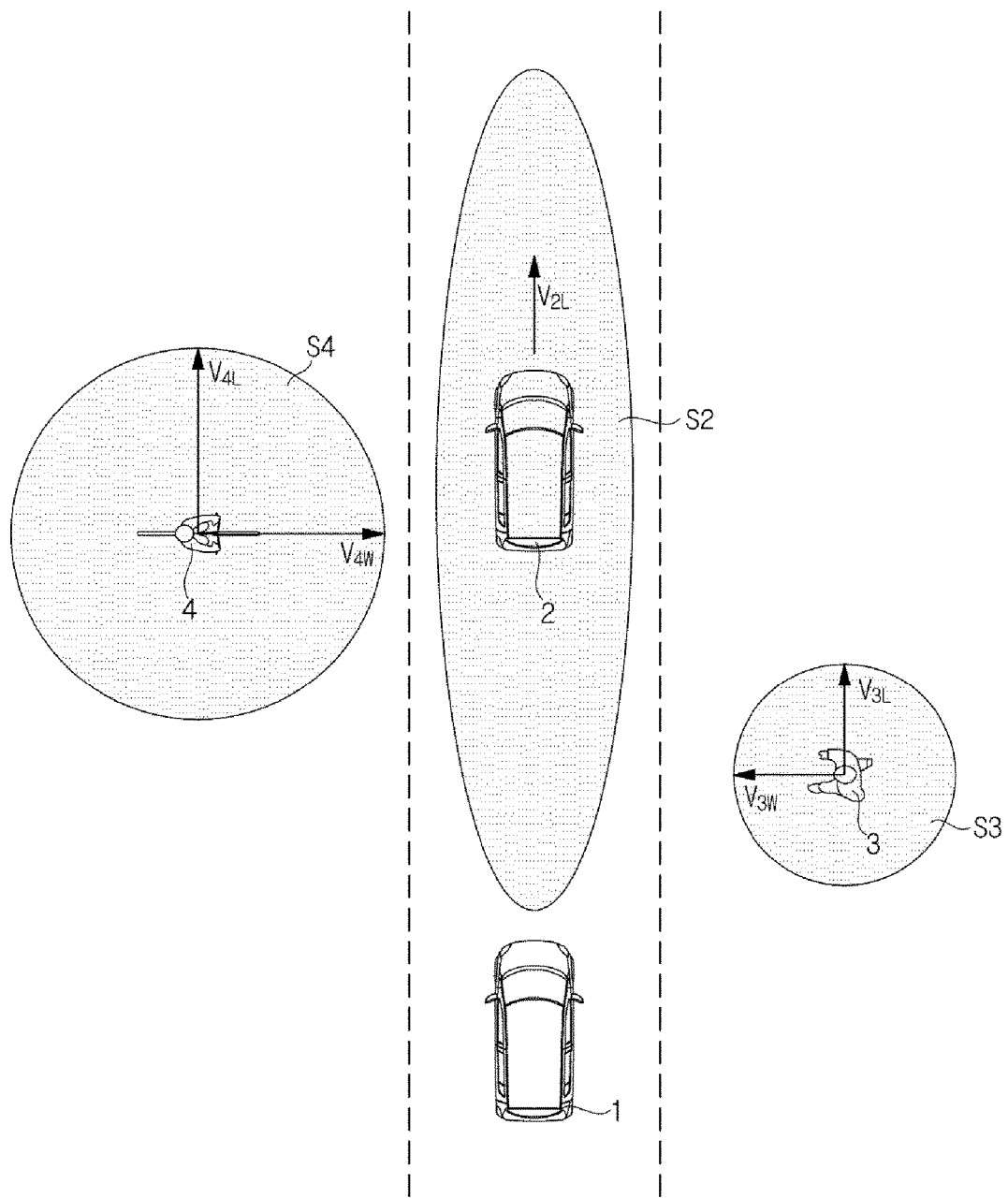
FIG. 7 is a conceptual diagram illustrating a collision risk area based on a moving speed of a detected object by corresponding to the type of the object according to an embodiment of the present disclosure.

FIG. 7 is a conceptual diagram illustrating a collision risk area based on a moving speed of a detected object by corresponding to the type of the object according to an embodiment of the present disclosure.

Referring to FIG. 7, the type of the object may include the target vehicle 2, the pedestrian 3 and the bicycle 4 all of which are placed in front of the vehicle 1. In addition, the type of the object is not limited thereto, but it may be assumed that the object is at least one of the target vehicle 2, the pedestrian 3 and the bicycle 4. Further, it may be assumed that the bicycle 4 is the bicycle 4 which is moving and on which a driver is boarded.

As illustrated in FIG. 7, since the moving speed varies depending on the type of object, a distance that can be moved for the same time may be variable. That is, since the moving direction and speed of the target vehicle 2, the pedestrian 3 and the bicycle 4 are different from each other, a distance that can be moved for the same time may be different and thus a possibility of collision or a risk of collision between each of the target vehicle 2, the pedestrian 3 and the bicycle 4, and the vehicle 1 may be different from each other. In general, because the moving speed of the target vehicle 2 is the fastest and the moving speed of the bicycle 4 is faster than the moving speed of the pedestrian 3, a distance in which the target vehicle 2 can be moved for the same time may be the farthest.

In a state in which the object is the target vehicle 2, when a driving speed of the target vehicle 2 is $V_{2L}$, it may represent that the target vehicle 2 is driving at a speed of $V_{2L}$ in front of the vehicle 1 in the longitudinal direction, and in this time, the TTC may be determined based on the relative distance and the relative speed between the vehicle 1 and the target vehicle 2.

When the object is the target vehicle 2, since the target vehicle 2 typically drives in the lane of the road, a speed of longitudinal movement may have more influence on determining the TTC, than a speed of transverse movement. Therefore, when the object, which is detected by the image capturer 350 and the sensor 200 of the vehicle 1, is the target vehicle 2, an area, which is based on the speed of longitudinal movement ($V_{2L}$) and a longitudinal relative distance of the target vehicle 2, may become a reference area (S2) for determining the possibility of collision or the risk of collision between the vehicle 1 and the target vehicle 2, as illustrated.

When the object is the pedestrian 3, a moving speed ($V_3$) of the pedestrian 3 may be divided into a speed of transverse movement ($V_{3W}$) and a speed of longitudinal movement ($V_{3L}$). That is, since the pedestrian 3 is capable of freely walking in the longitudinal direction or the transverse direction, the pedestrian 3 may move in the different direction at the moving speed ($V_3$) and may move in any direction in an area of circle with a radius that is a distance in which the pedestrian 3 can move for the same time.

When the pedestrian 3 moves during the vehicle 1 drives, the TTC may be determined based on the relative distance and the relative speed between the vehicle 1 and the pedestrian 3. In this case, for determining the TTC, the speed of transverse movement ($V_{3W}$) and the speed of longitudinal movement ($V_{3L}$) of the pedestrian 3 may be considered. Accordingly, when the pedestrian 3 moves in the transverse direction during the vehicle 1 drives, the controller 100 may determine a point of time when the pedestrian 3 collides with the vehicle 1, and when the pedestrian 3 moves in the longitudinal direction during the vehicle 1 drives, the controller 100 may determine a point of time when the pedestrian 3 collides with the vehicle 1.

Therefore, when the object, which is detected by the image capturer 350 and the sensor 200 of the vehicle 1, is the pedestrian 3, an area, which is based on the speed of transverse movement ($V_{3W}$) and the speed of longitudinal movement ($V_{3L}$), may become a reference area (S3) for determining the possibility of collision or the risk of collision between the vehicle 1 and the pedestrian 3, as illustrated.

When the object is the bicycle 4, a moving speed ($V_4$) of the bicycle 4 may be divided into a speed of transverse movement ($V_{4W}$) and a speed of longitudinal movement ($V_{4L}$). That is, since the bicycle 4 is capable of freely moving in the longitudinal direction or the transverse direction, the bicycle 4 may move in the different direction at the moving speed ($V_4$) and may move in any direction in an area of circle with a radius that is a distance in which the bicycle 4 can move for the same time, as illustrated in FIG. 7.

When the bicycle 4 moves during the vehicle 1 drives, the TTC may be determined based on the relative distance and the relative speed between the vehicle 1 and the bicycle 4. In this case, for determining the TTC, the speed of transverse movement ($V_{4W}$) and the speed of longitudinal movement ($V_{4L}$) of the bicycle 4 may be considered. Accordingly, when the bicycle 4 moves in the transverse direction during the vehicle 1 drives the controller 100 may determine a point of time when the bicycle 4 collides with the vehicle 1, and when the bicycle 4 moves in the longitudinal direction during the vehicle 1 drives, the controller 100 may determine a point of time when the bicycle 4 collides with the vehicle 1.

Therefore, when the object that is detected by the image capturer 350 and the sensor 200 of the vehicle 1 is the bicycle 4, an area, which is based on the speed of transverse movement ($V_{4W}$) and the speed of longitudinal movement ($V_{4L}$), may become a reference area (S4) for determining the possibility of collision or the risk of collision between the vehicle 1 and the bicycle 4, as illustrated. Since the moving speed of the bicycle 4 is faster than the moving speed of the pedestrian 3, the reference area (S4) for determining the possibility of collision or the risk of collision between the vehicle 1 and the bicycle 4, may be larger than the reference area (S3) for determining the possibility of collision or the risk of collision between the vehicle 1 and the pedestrian 3.

FIGS. 8 to 11 are concept diagrams illustrating variably determining a detection target area based on the type of the object according to an embodiment of the present disclosure.

Figure 8:
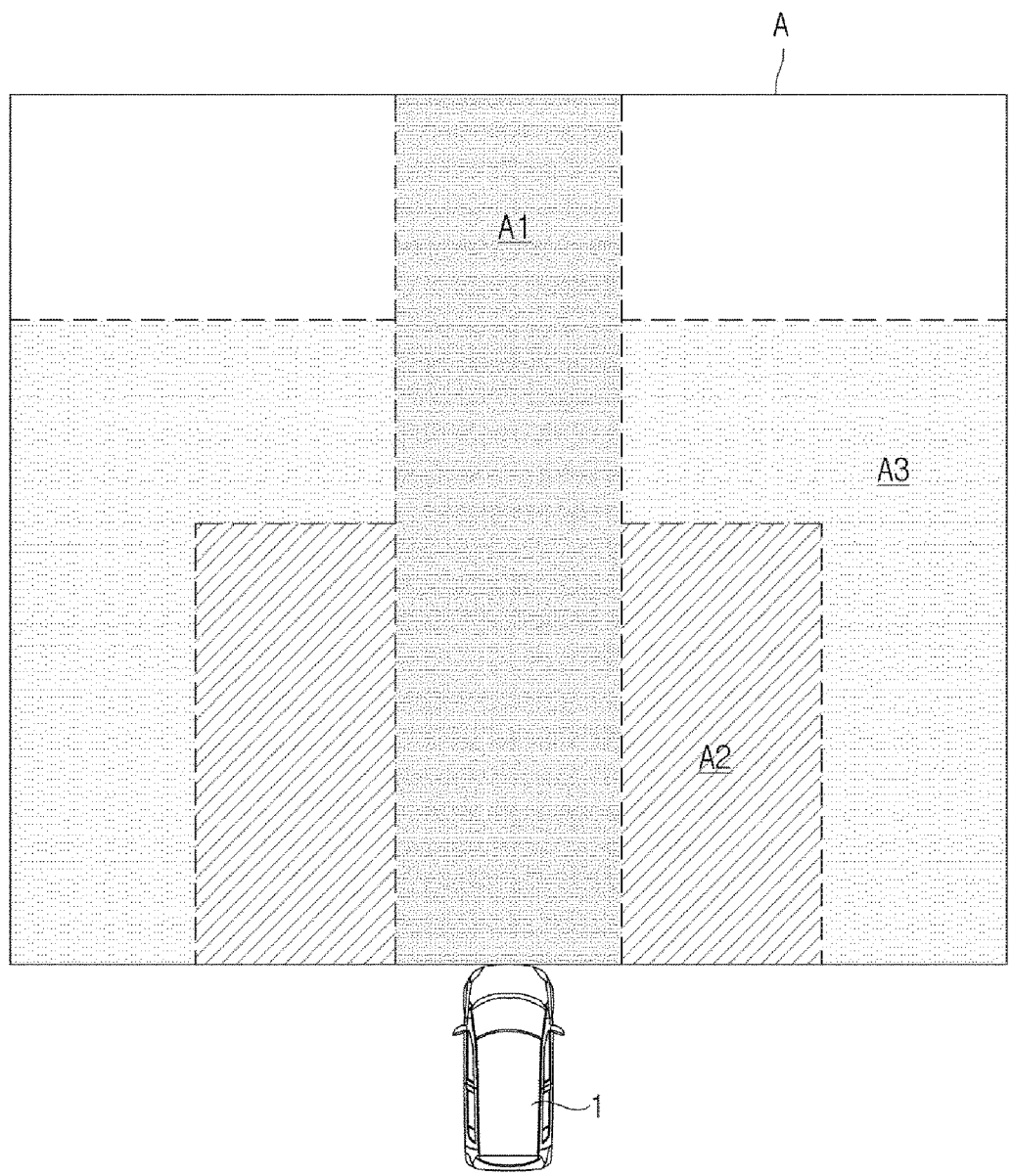
FIGS. 8 to 11 are concept diagrams illustrating variably determining a detection target area based on the type of the object according to an embodiment of the present disclosure.

Referring to FIG. 8, the detection object area, which is for detecting the object to allow the sensor 200 provided in the vehicle 1 to perform a collision avoidance control, may be variably determined based on the type of the object.

As mentioned above, the sensor 200 may emit electromagnetic waves, e.g., microwaves or millimeter waves, pulsed laser light, ultrasonic waves, or infrared light to the object, receive pulsed laser light, ultrasonic waves, or infrared light, which are reflected or scatted by the object, and determine the presence of the object, the distance between the vehicle 1 and the object or a speed of moving object.

According to the conventional method, since the sensor 200 emits the electromagnetic waves to all area in front of the vehicle 1 to detect an object placed in front, receives pulsed laser light which is reflected or scatted by all object placed in front of the vehicle 1, and determines the distance between the vehicle 1 and the object or the speed of moving object, it may lead to increasing unnecessary amount of calculation.

According to the embodiment of the present disclosure, the vehicle 1 and the method for controlling thereof may perform detecting an object around the vehicle 1, determining a detection target area, which is for detecting the object for the collision avoidance, based on the type of the detected object, and applying a collision avoidance control to the object placed in the determined detection target area.

FIG. 8 illustrates an area in which the sensor 200 of the vehicle 1 can detect an object. In this time, according to the determined area according to the embodiment, when an entire area, in which the sensor 200 can detect an object, is (A), it may be possible to determine a first detection target area (A1), a second detection target area (A2), and a third detection target area (A3), based on the type of the object, and to detect the object without detecting all objects in the entire area (A).

In this time, the third detection target area (A3) may be an area that is more extended in the longitudinal direction and the transverse direction than the second detection target area (A2).

Figure 9:
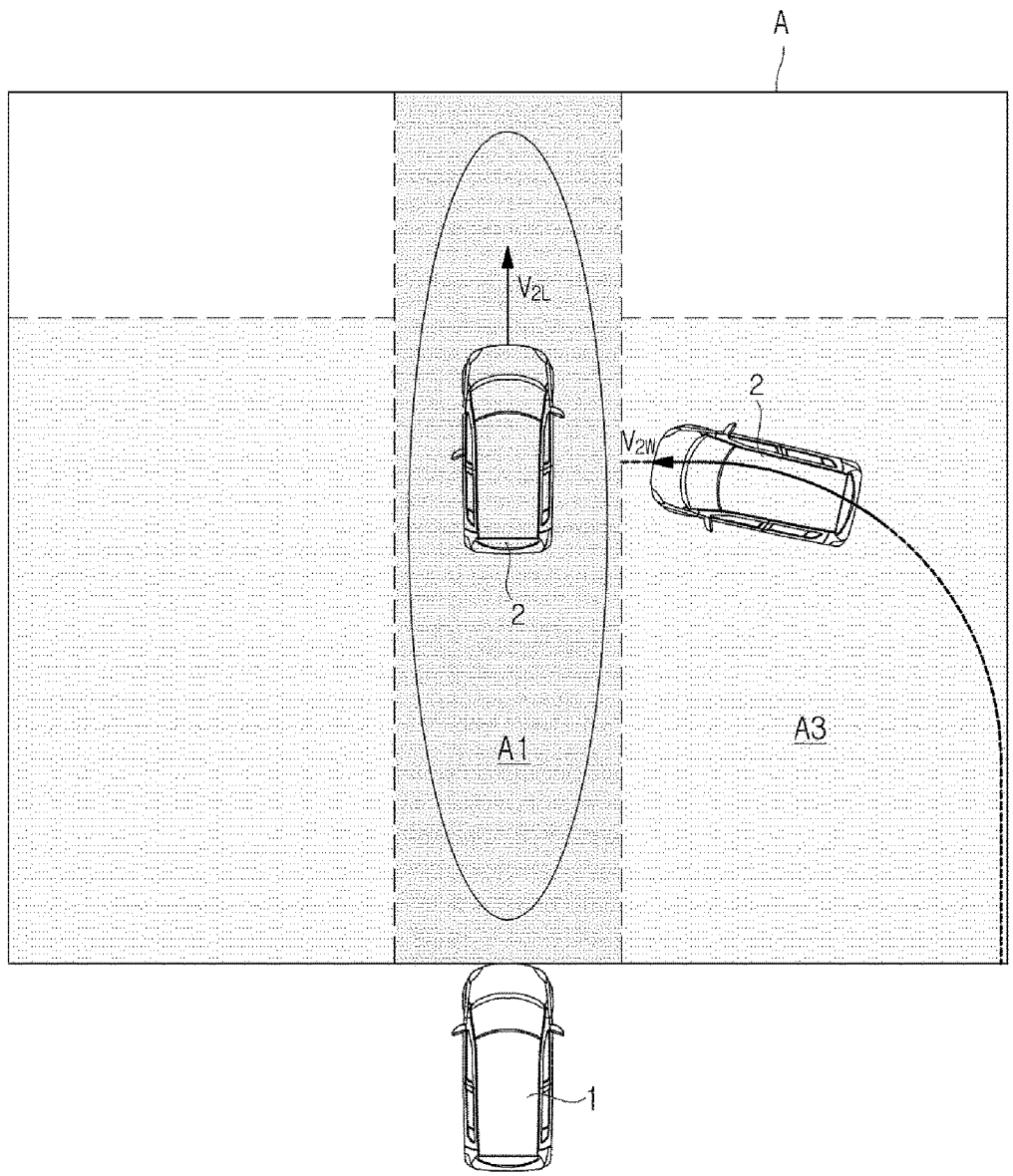

Referring to FIG. 9, when the object, which is detected by the image capturer 350 and the sensor 200 of the vehicle 1, is the target vehicle 2, the target vehicle 2 may typically present in the lane in front of the vehicle 1, and drive at the speed of longitudinal movement, as mentioned in FIG. 7.

Therefore, the controller 100 may determine the first detection target area (A1) as a detection target area for detecting the object for the collision avoidance, based on the speed of longitudinal movement ($V_{2L}$) and the longitudinal moving distance of the target vehicle 2.

In contrast, when the target vehicle 2 turns the left side or the right side without driving in the longitudinal direction in the lane in front of the vehicle 1, the target vehicle 2 may drive in the transverse direction with respect to the driving direction of the vehicle 1 and thus the controller 100 may determine the third detection target area (A3) as a detection target area.

When determining the detection target area about the target vehicle 2, the controller 100 may determine an area of the detection target area based on at least one of the speed of transverse movement ($V_{2W}$) and the speed of longitudinal movement ($V_{2L}$) of the target vehicle 2. That is, an area of the first detection target area (A1) may be determined based on the speed of longitudinal movement ($V_{2L}$) of the target vehicle 2, and an area of the third detection target area (A3) may be determined based on the speed of transverse movement ($V_{2W}$) of the target vehicle 2.

When the detected object is the target vehicle 2, the controller 100 may calculate a TTC between the vehicle 1 and the target vehicle 2 based on at least one of position information and speed information of the target vehicle 2 placed in the first detection target area (A1) or the third detection target area (A3), which is determined as mentioned above.

That is, the controller 100 may perform the collision avoidance control on the target vehicle 2 placed in the first detection target area (A1) or the third detection target area (A3), without performing the collision avoidance control on the entire area (A) that is detected by the sensor 200. In this time, the collision avoidance control may represent an operation to avoid the collision between the vehicle 1 and the target vehicle 2, wherein the operation is performed by calculating a TTC avoidance between the vehicle 1 and the target vehicle 2 and by controlling a driving speed of the vehicle 1 according the calculated TTC avoidance.

The controller 100 may calculate the relative distance and the relative speed between the vehicle 1 and the target vehicle 2 by using the position information and the speed information of the target vehicle 2 placed in the first detection target area (A1) or the third detection target area (A3), and calculate the TTC between the vehicle 1 and the target vehicle 2 based on the calculated relative distance and relative speed.

The sensor 200 may acquire the position information and the speed information of the target vehicle 2 based on the first detection target area (A1) or the third detection target area (A3), and the controller 100 may calculate a time left until collision between the vehicle 1 and the target vehicle 2 based on the information acquired by the sensor 200 and the driving speed of the vehicle 1. A method in which the controller 100 calculates the TTC between the vehicle 1 and the target vehicle 2 may be well known and thus a detail description thereof will be omitted.

The controller 100 may calculate the TTC between the vehicle 1 and the target vehicle 2 and then determine an amount of deceleration of the vehicle 1 based on the calculated TTC. That is, when the calculated TTC is shorter than a predetermined reference time, a risk of collision may be high and thus the controller 100 may determine the amount of deceleration of the vehicle 1 to be large and transmit a control signal to reduce the speed of the vehicle 1 based on the determined amount of deceleration.

The reference time of the TTC for determining the amount of deceleration of the vehicle 1 may be pre-stored in the storage 90 or may be changed according to setting. In addition, the size of the amount of deceleration of the vehicle 1 may vary according to the relative speed and the relative distance between the vehicle 1 and the target vehicle 2.

That is, the controller 100 may control the driving speed of the vehicle 1 by controlling the speed regulator 70 to avoid the collision between the vehicle 1 and the target vehicle 2 driving in the longitudinal direction or the transverse direction.

In addition, it may be possible to avoid the collision of the vehicle 1 by braking or one side braking as well as adjusting the driving speed of the vehicle 1.

Figure 10:
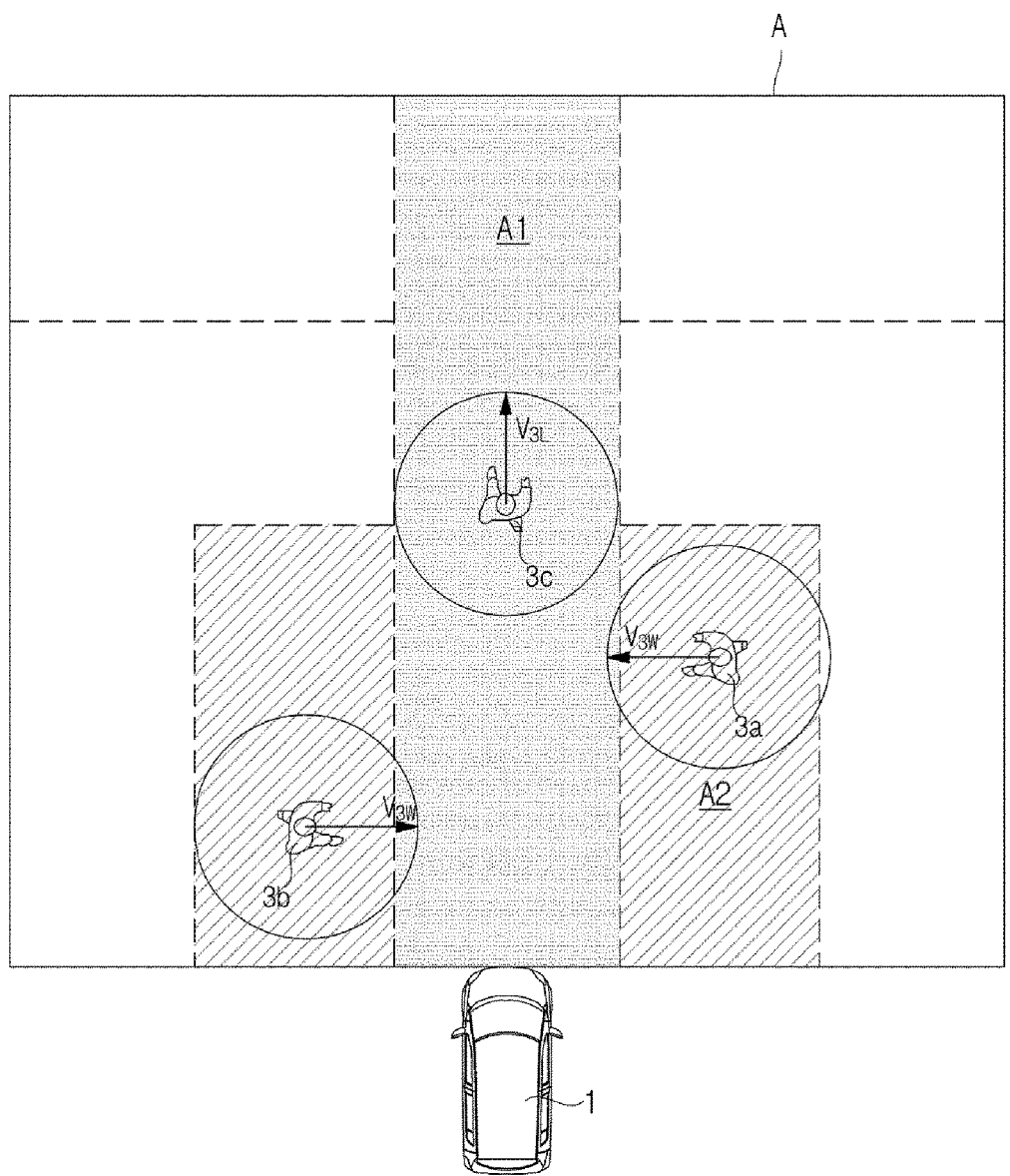

Referring to FIG. 10, when the object, which is detected by the image capturer 350 and the sensor 200 of the vehicle 1, is the pedestrian 3, the moving speed ($V_3$) of the pedestrian 3 may be divided into the speed of transverse movement ($V_{3W}$) and the speed of longitudinal movement ($V_{3L}$), as illustrated in FIG. 7.

Therefore, the controller 100 may determine the first detection target area (A1) or the second detection target area (A2) as a detection target area for detecting the object for the collision avoidance, based on the speed of transverse movement ($V_{3W}$) and the transverse moving distance of the pedestrian 3 or the speed of longitudinal movement ($V_{3L}$) and the longitudinal moving distance of the pedestrian 3.

As illustrated in FIG. 10, the pedestrian 3 may move in the transverse direction or the longitudinal direction with respect to the driving direction of the vehicle 1.

Particularly, a pedestrian 3a and 3b moving in the transverse direction may move in the right or left side at the speed of transverse movement ($V_{3W}$), and an area of the reference area for determining the possibility of collision or the risk of collision between the vehicle 1 and the pedestrian 3 may vary according to the size of the speed of transverse movement ($V_{3W}$).

The controller 100 may determine the second detection target area (A2) as a detection target area for detecting the object for the collision avoidance, based on the speed of transverse movement ($V_{3W}$) and the transverse moving distance of the pedestrian 3. That is, the controller 100 may determine the second detection target area (A2) as a pedestrian detection area for detecting the pedestrian 3 for the collision avoidance between the vehicle 1 and the pedestrian 3, and then perform the collision avoidance control on the second detection target area (A2).

A pedestrian 3c moving in the longitudinal direction may move in the longitudinal direction at the speed of longitudinal movement ($V_{3L}$), and an area of the reference area for determining the possibility of collision or the risk of collision between the vehicle 1 and the pedestrian 3 may vary according to the size of the speed of longitudinal movement ($V_{3L}$).

The controller 100 may determine the first detection target area (A1) as a detection target area for detecting the object for the collision avoidance, based on the speed of longitudinal movement ($V_{3L}$) and the longitudinal moving distance of the pedestrian 3. That is, the controller 100 may determine the first detection target area (A1) as a pedestrian detection area for detecting the pedestrian 3 for the collision avoidance between the vehicle 1 and the pedestrian 3, and then perform the collision avoidance control on the first detection target area (A1).

When determining the detection target area about the pedestrian 3, the controller 100 may determine an area of the detection target area based on at least one of the speed of transverse movement ($V_{3W}$) and the speed of longitudinal movement ($V_{3L}$) of the pedestrian 3. That is, an area of the first detection target area (A1) may be determined based on the speed of longitudinal movement ($V_{3L}$) of the pedestrian 3, and an area of the second detection target area (A2) may be determined based on the speed of transverse movement ($V_{3W}$) of the pedestrian 3.

When the detected object is the pedestrian 3, the controller 100 may calculate a TTC between the vehicle 1 and the pedestrian 3 based on the at least one of position information and speed information of the pedestrian 3 placed in the first detection target area (A1) or the second detection target area (A2), which is determined as mentioned above.

That is, the controller 100 may perform the collision avoidance control on the first detection target area (A1) or the second detection target area (A2) in which the pedestrian 3 is placed, without performing the collision avoidance control on the entire area (A) that is detected by the sensor 200.

The controller 100 may calculate the relative distance and the relative speed between the vehicle 1 and the pedestrian 3 by using the position information and the speed information of the pedestrian 3 placed in the first detection target area (A1) or the second detection target area (A2), and calculate the TTC between the vehicle 1 and the pedestrian 3 based on the calculated relative distance and relative speed.

The sensor 200 may acquire the position information and the speed information of the pedestrian 3 based on the first detection target area (A1) or the second detection target area (A2), and the controller 100 may calculate a time left until collision between the vehicle 1 and the pedestrian 3 based on the information acquired by the sensor 200 and the driving speed of the vehicle 1.

The controller 100 may calculate the TTC between the vehicle 1 and the pedestrian 3 and then determine an amount of deceleration of the vehicle 1 based on the calculated TTC. That is, when the calculated TTC is shorter than a predetermined reference time, the risk of collision may be high and thus the controller 100 may determine the amount of deceleration of the vehicle 1 to be large and transmit a control signal to reduce the speed of the vehicle 1 based on the determined amount of deceleration.

The size of the amount of deceleration of the vehicle 1 may vary according to the relative speed and the relative distance between the vehicle 1 and the pedestrian 3.

That is, the controller 100 may control the driving speed of the vehicle 1 by controlling the speed regulator 70 to avoid the collision between the vehicle 1 and the pedestrian 3a and 3b moving in the transverse direction or the pedestrian 3c moving in the longitudinal direction.

In addition, it may be possible to avoid the collision of the vehicle 1 by braking or one side braking as well as adjusting the driving speed of the vehicle 1.

Figure 11:
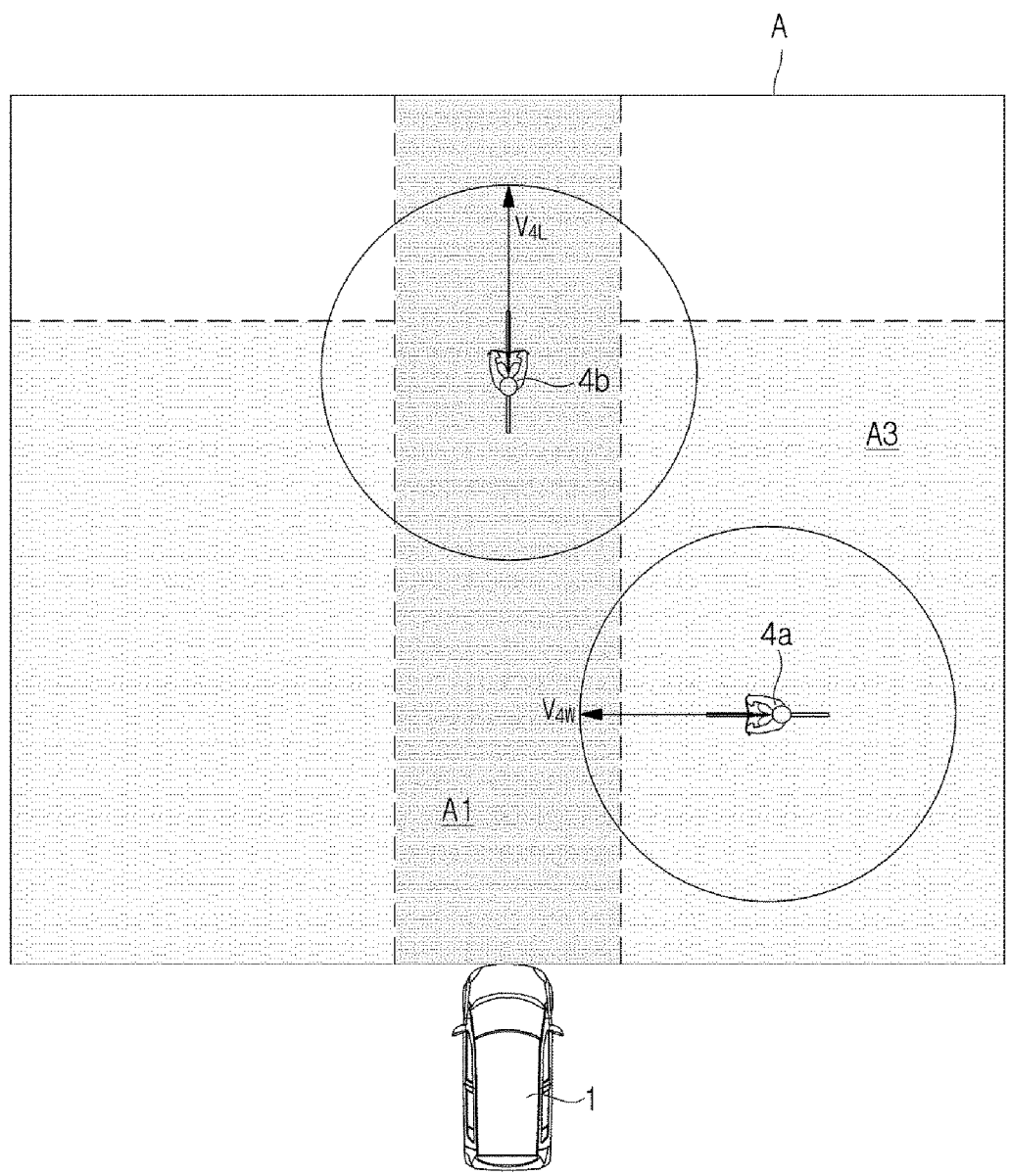

Referring to FIG. 11, when the object, which is detected by the image capturer 350 and the sensor 200 of the vehicle 1, is the bicycle 4, the moving speed ($V_4$) of the bicycle 4 may be divided into the speed of transverse movement ($V_{4W}$) and the speed of longitudinal movement ($V_{4L}$), as illustrated in FIG. 7.

Therefore, the controller 100 may determine the first detection target area (A1) or the third detection target area (A3) as a detection target area for detecting the object for the collision avoidance, based on the speed of transverse movement ($V_{4W}$) and the transverse moving distance of the bicycle 4 or the speed of longitudinal movement ($V_{4L}$) and the longitudinal moving distance of the bicycle 4.

As illustrated in FIG. 11, the bicycle 4 may move in the transverse direction and the longitudinal direction with respect to the driving direction of the vehicle 1.

Particularly, a bicycle 4a moving in the transverse direction may move in the right or left side at the speed of transverse movement ($V_{4W}$), and an area of the reference area for determining the possibility of collision or the risk of collision between the vehicle 1 and the bicycle 4 may vary according to the size of the speed of transverse movement ($V_{4W}$).

The controller 100 may determine the third detection target area (A3) as a detection target area for detecting the object for the collision avoidance, based on the speed of transverse movement ($V_{4W}$) and the transverse moving distance of the bicycle 4. That is, the controller 100 may determine the third detection target area (A3) as a bicycle detection area for detecting the bicycle 4 for the collision avoidance between the vehicle 1 and the bicycle 4, and then perform the collision avoidance control on the third detection target area (A3).

A bicycle 4b moving in the longitudinal direction may move in the longitudinal direction at the speed of longitudinal movement ($V_{4L}$), and an area of the reference area for determining the possibility of collision or the risk of collision between the vehicle 1 and the bicycle 4 may vary according to the size of the speed of longitudinal movement ($V_{4L}$).

The controller 100 may determine the first detection target area (A1) as a detection target area for detecting the object for the collision avoidance, based on the speed of longitudinal movement ($V_{4L}$) and the longitudinal moving distance of the bicycle 4. That is, the controller 100 may determine the first detection target area (A1) as a bicycle detection area for detecting the bicycle 4 for the collision avoidance between the vehicle 1 and the bicycle 4, and then perform the collision avoidance control on the first detection target area (A1).

When determining the detection target area about the bicycle 4, the controller 100 may determine an area of the detection target area based on at least one of the speed of transverse movement ($V_{4W}$) and the speed of longitudinal movement ($V_{4L}$) of the bicycle 4. That is, an area of the first detection target area (A1) may be determined based on the speed of longitudinal movement ($V_{4L}$) of the bicycle 4, and an area of the third detection target area (A3) may be determined based on the speed of transverse movement ($V_{4W}$) of the bicycle 4.

When the detected object is the bicycle 4, the controller 100 may calculate a TTC between the vehicle 1 and the bicycle 4 based on at least one of position information and speed information of the bicycle 4 placed in the first detection target area (A1) or the third detection target area (A3), which is determined as mentioned above.

That is, the controller 100 may perform the collision avoidance control on the first detection target area (A1) or the third detection target area (A3) in which the bicycle 4 is placed, without performing the collision avoidance control on the entire area (A) that is detected by the sensor 200.

The controller 100 may calculate the relative distance and the relative speed between the vehicle 1 and the bicycle 4 by using the position information and the speed information of the bicycle 4 placed in the first detection target area (A1) or the third detection target area (A3), and calculate the TTC between the vehicle 1 and the bicycle 4 based on the calculated relative distance and relative speed.

The sensor 200 may acquire the position information and the speed information of the bicycle 4 based on the first detection target area (A1) or the third detection target area (A3), and the controller 100 may calculate a time left until collision between the vehicle 1 and the bicycle 4 based on the information acquired by the sensor 200 and the driving speed of the vehicle 1.

The controller 100 may calculate the TTC between the vehicle 1 and the bicycle 4 and then determine an amount of deceleration of the vehicle 1 based on the calculated TTC. That is, when the calculated TTC is shorter than a predetermined reference time, the risk of collision may be high and thus the controller 100 may determine the amount of deceleration of the vehicle 1 to be large and transmit a control signal to reduce the speed of the vehicle 1 based on the determined amount of deceleration. The size of the amount of deceleration of the vehicle 1 may vary according to the relative speed and the relative distance between the vehicle 1 and the bicycle 4.

That is, the controller 100 may control the driving speed of the vehicle 1 by controlling the speed regulator 70 to avoid the collision between the vehicle 1 and the bicycle 4b moving in the longitudinal direction or the bicycle 4a moving in the transverse direction.

In addition, it may be possible to avoid the collision of the vehicle 1 by braking or one side braking as well as adjusting the driving speed of the vehicle 1.

FIGS. 8 to 11 illustrate that the object detected around the vehicle 1 is any one of the target vehicle 2, the pedestrian 3 and the bicycle 4. However, the object detected by the image capturer 350 may be at least one of the target vehicle 2, the pedestrian 3 and the bicycle 4 and the above mentioned method for controlling the vehicle may be applied redundantly according to the type of the detected plurality of objects.

Figure 12:
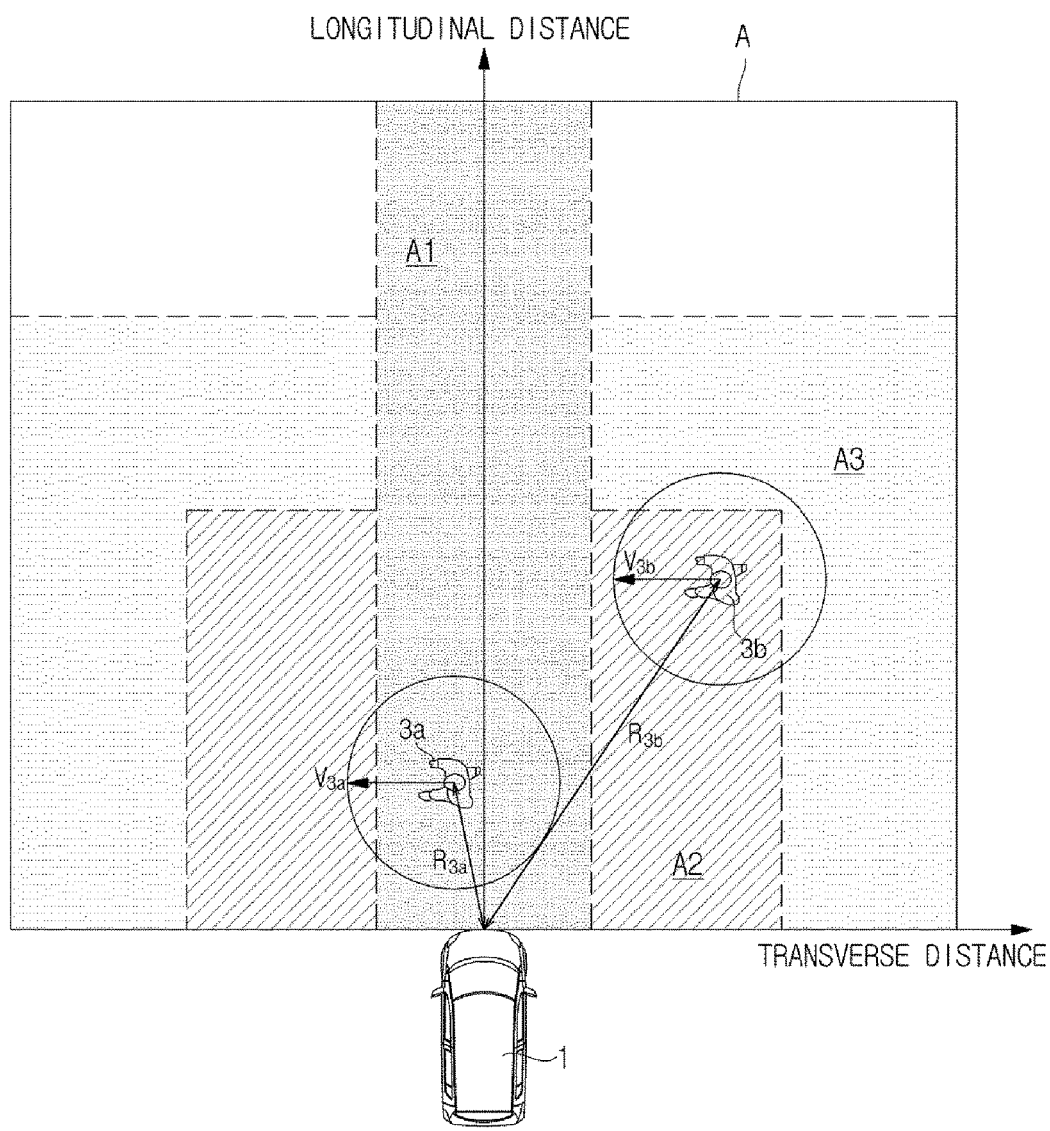
FIG. 12 is a concept diagram illustrating a variation of the risk of collision between the vehicle and the object according to an embodiment of the present disclosure.

FIG. 12 is a concept diagram illustrating a variation of the risk of collision between the vehicle and the object according to an embodiment of the present disclosure.

For convenience of description, FIG. 12 illustrates that the object is the pedestrian 3.

As mentioned above, the controller 100 may detect the object based on the determined detection target area and calculate the TTC between the vehicle 1 and the object based on at least one of the position information and speed information of the object. However, the TTC between the vehicle 1 and the object may be changed according to the moving speed and the position of the object.

Referring to FIG. 12, when calculating the TTC between the vehicle 1 and the object, which is detected in the first detection target area (A1) or the second detection target area (A2), although both of the pedestrian 1 (3a) and the pedestrian 2 (3b) move in the transverse direction, a moving speed of the pedestrian 1 (3a) and the pedestrian 2 (3b) may be different from each other while a distance between the vehicle 1 and the pedestrian 1 (3a), and a distance between the vehicle 1 and the pedestrian 2 (3b) are different from each other.

When with respect to the vehicle 1, the pedestrian 1 (3a) is closer to the vehicle 1 than the pedestrian 2 (3b) in the transverse direction and in the longitudinal direction, a relative distance ($R_{3a}$) between the pedestrian 1 (3a) and the vehicle 1 may be shorter than a relative distance ($R_{3b}$) between the pedestrian 2 (3b) and the vehicle 1 and thus a TTC between the pedestrian 1 (3a) and the vehicle 1 may be shorter than a TTC between the pedestrian 2 (3b) and the vehicle 1.

As illustrated in FIG. 12, when both of the pedestrian 1 (3a) and the pedestrian 2 (3b) move toward the left side in the transverse direction with respect to the position of the vehicle 1, the TTC between the pedestrian 1 (3a) and the vehicle 1 may be shorter as a speed of transverse movement ($V_{3a}$) of the pedestrian 1 (3a) is slow, but the TTC between the pedestrian 2 (3b) and the vehicle 1 may be shorter as a speed of transverse movement ($V_{3b}$) of the pedestrian 1 (3a) is fast.

That is, as the transverse distance or the longitudinal distance of the object placed in front of the vehicle 1 is far from the vehicle 1 with respect to the driving direction of the vehicle 1, the TTC between the vehicle 1 and the object may be longer and thus the risk of collision may be determined to be low. In contrast, as the transverse distance or the longitudinal distance of the object placed in front of the vehicle 1 is close to the vehicle 1 with respect to the driving direction of the vehicle 1, the TTC between the vehicle 1 and the object may be shorter and thus the risk of collision may be determined to be high.

Further, as the moving speed of the object in the driving direction of the vehicle 1 is great, the TTC between the vehicle 1 and the object may be shorter and thus the risk of collision may be determined to be high. In contrast, as the moving speed of the object in the driving direction of the vehicle 1 is less, the TTC between the vehicle 1 and the object may be longer and thus the risk of collision may be determined to be low.

The controller 100 may variably determine the amount of deceleration of the vehicle 1 according to the position and speed of the object placed in front of the vehicle 1, and thus the driving speed of the vehicle 1 may be variably adjusted.

Figure 13:
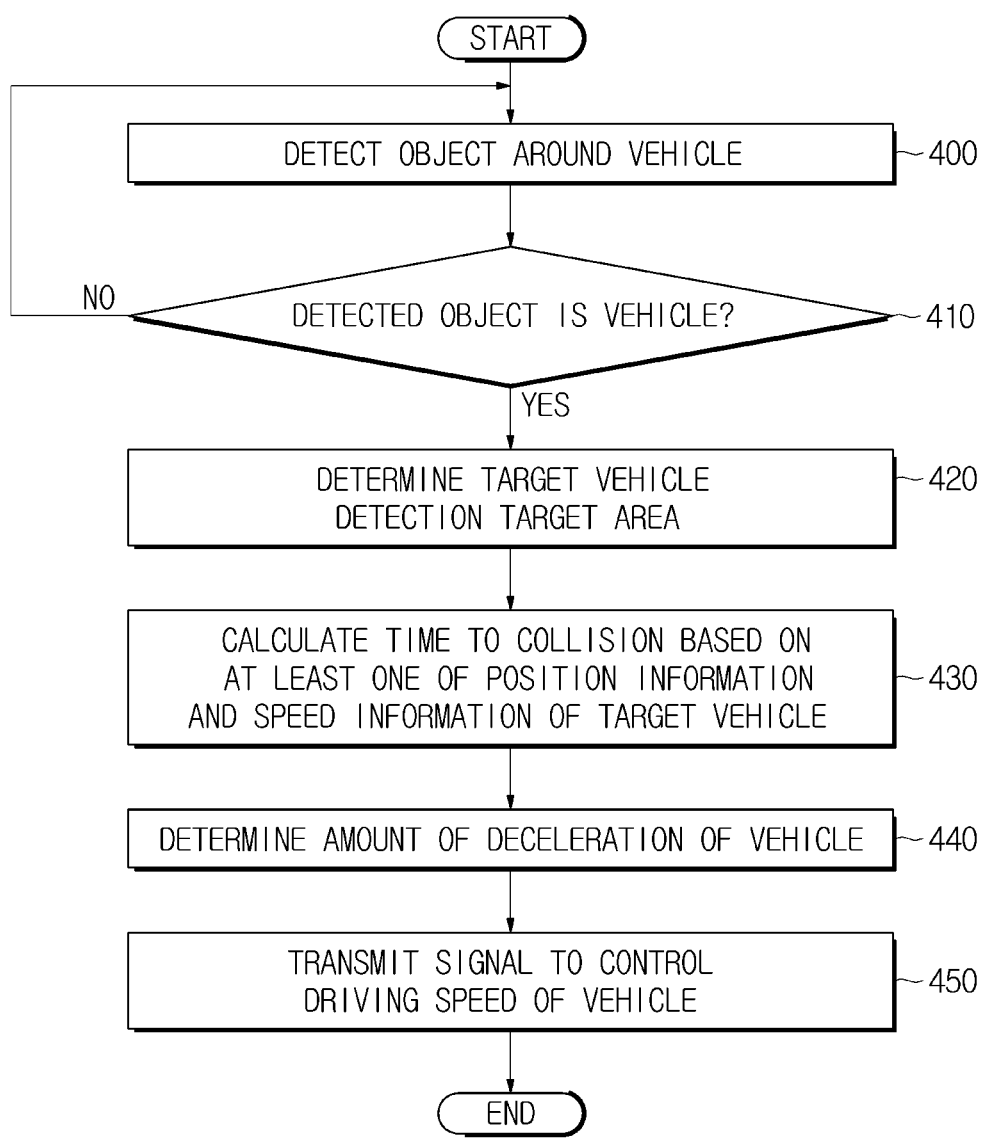
FIGS. 13 to 15 are flowcharts of a method for controlling a vehicle according to an embodiment of the present disclosure.
Figure 14:
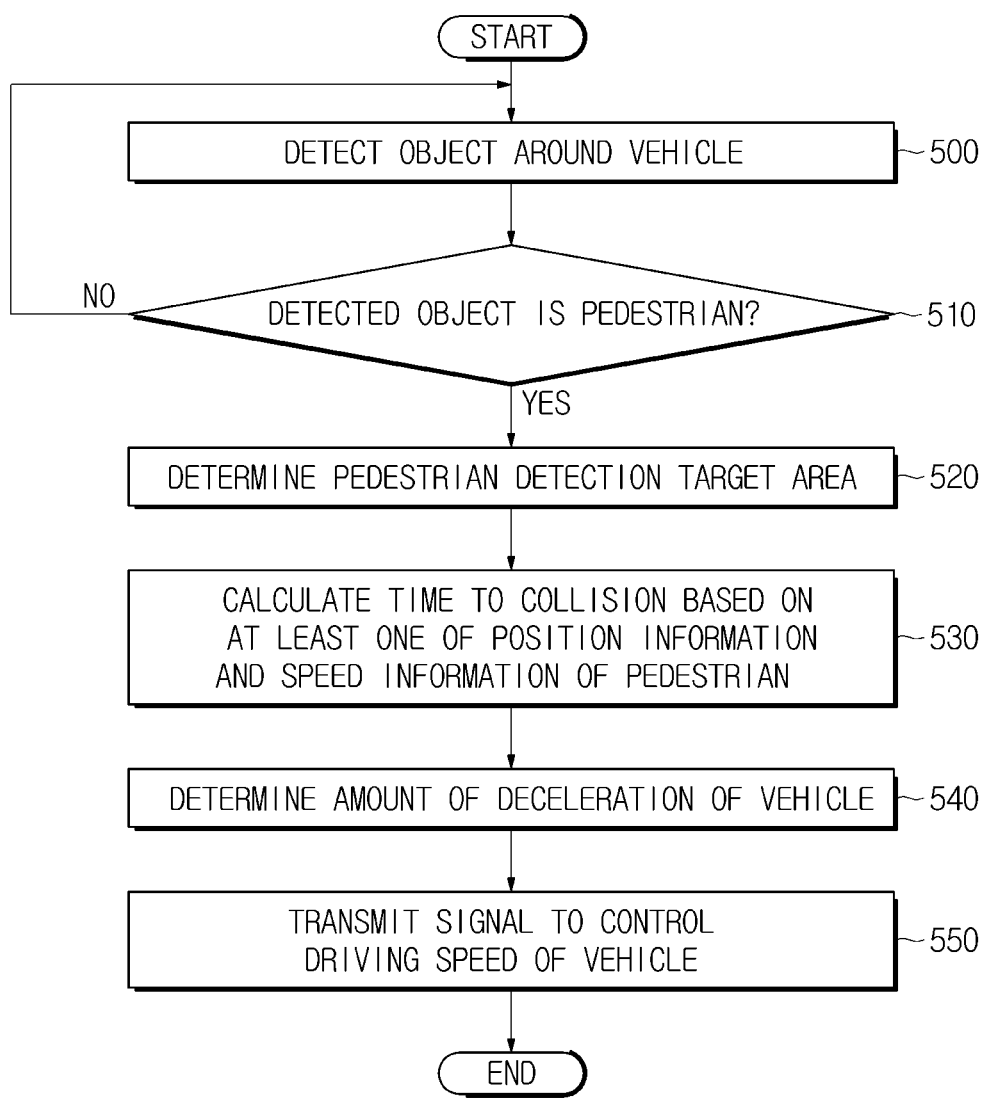
Figure 15:
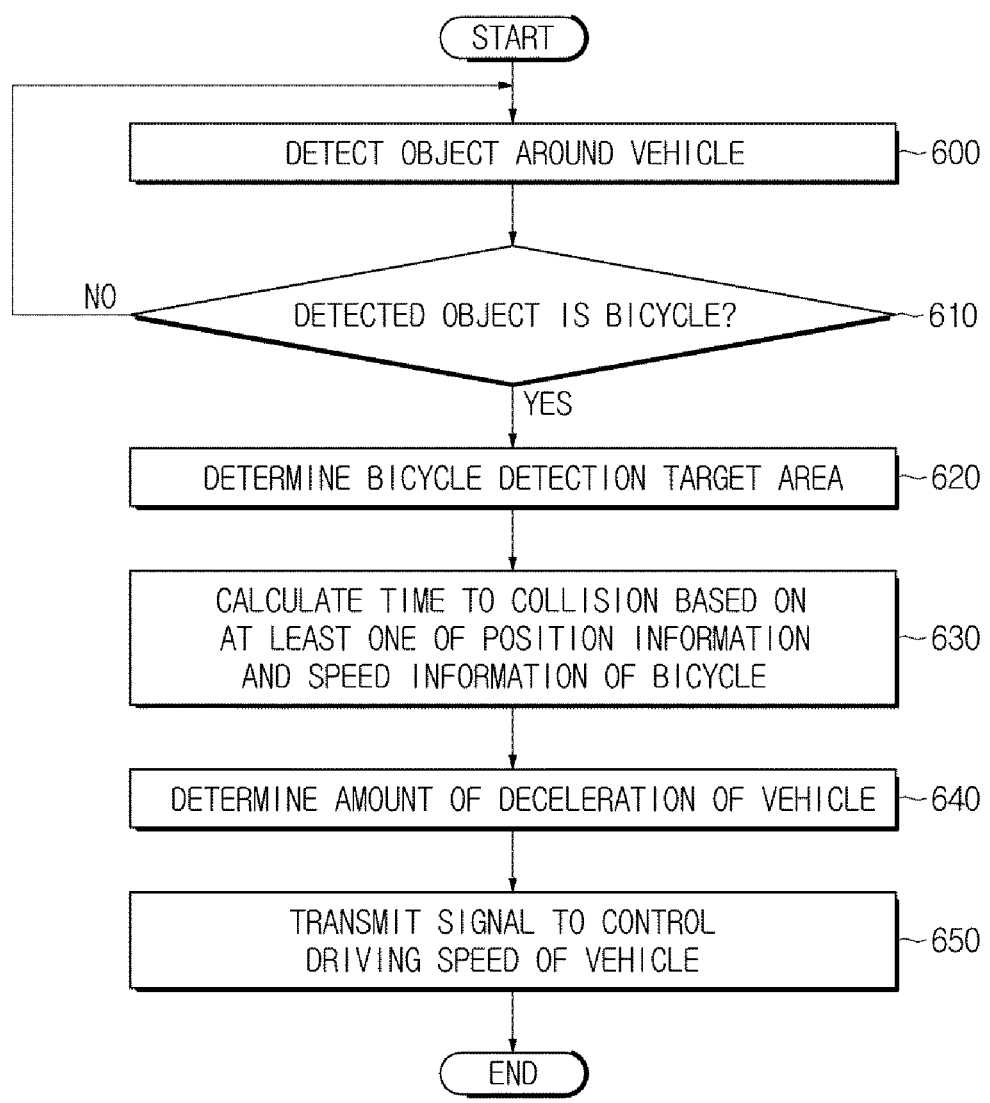

FIGS. 13 to 15 are flowcharts of a method for controlling a vehicle according to an embodiment of the present disclosure.

Referring to FIG. 13, the image capturer 350 may capture and detect an object around the vehicle 1 under the control of the controller 100 (400), and the sensor 200 may acquire at least one of position information and speed information of the object.

The controller 100 may determine whether the type of the detected object is another vehicle or not (410), and when it is determined that the object is another vehicle, the controller 100 may determine a detection target area about the target vehicle 2 (420). Particularly, when the target vehicle 2 drives in the longitudinal direction, the controller 100 may determine the first detection area (A1) as a detection target area, based on the speed of longitudinal movement ($V_{2L}$) and the longitudinal moving distance of the target vehicle 2. In addition, when the target vehicle 2 drives in the transverse direction, the controller 100 may determine the third detection area (A3) as a detection target area, based on the speed of transverse movement ($V_{2w}$) and the transverse moving distance of the target vehicle 2.

The controller 100 may calculate the TTC between the vehicle 1 and the target vehicle 2 based on at least one of position information and speed information of the target vehicle 2 that is detected in the determined detection target area (430). The TTC between the vehicle 1 and the target vehicle 2 may be changed according to the position and driving speed of the target vehicle 2, as mentioned in FIG. 12.

The controller 100 may determine an amount of deceleration of the vehicle 1 based on the calculated TTC between the vehicle 1 and the target vehicle 2 (440), wherein the amount of deceleration may be great as the TTC is shorter, and the amount of deceleration may be less as the TTC is longer.

The controller 100 may transmit a control signal configured to control the speed regulator 70 so that the driving speed of the vehicle 1 is reduced based on the determined amount of deceleration (450) and then the driving speed of the vehicle 1 may be regulated in response to the transmitted control signal.

Referring to FIG. 14, the image capturer 350 may capture and detect an object around the vehicle 1 under the control of the controller 100 (500), and the sensor 200 may acquire at least one of position information and speed information of the object.

The controller 100 may determine whether the type of the detected object is the pedestrian 3 or not (510), and when it is determined that the object is the pedestrian 3, the controller 100 may determine a detection target area about the pedestrian 3 (520). Particularly, when the pedestrian 3 moves in the longitudinal direction, the controller 100 may determine the first detection area (A1) as a detection target area, based on the speed of longitudinal movement ($V_{3L}$) and the longitudinal moving distance of the pedestrian 3. In addition, when the pedestrian 3 moves in the transverse direction, the controller 100 may determine the second detection area (A2) as a detection target area, based on the speed of transverse movement ($V_{3w}$) and the transverse moving distance of the target vehicle 2.

The controller 100 may calculate the TTC between the vehicle 1 and the pedestrian 3 based on at least one of position information and speed information of the pedestrian 3 that is detected in the determined detection target area (530). The TTC between the vehicle 1 and the pedestrian 3 may be changed according to the position and driving speed of the pedestrian 3, as mentioned in FIG. 12.

The controller 100 may determine an amount of deceleration of the vehicle 1 based on the calculated TTC between the vehicle 1 and the pedestrian 3 (540), wherein the amount of deceleration may be great as the TTC is shorter, and the amount of deceleration may be less as the TTC is longer.

The controller 100 may transmit a control signal configured to control the speed regulator 70 so that the driving speed of the vehicle 1 is reduced based on the determined amount of deceleration (550) and then the driving speed of the vehicle 1 may be regulated in response to the transmitted control signal.

Referring to FIG. 15, the image capturer 350 may capture and detect an object around the vehicle 1 under the control of the controller 100 (600), and the sensor 200 may acquire at least one of position information and speed information of the object.

The controller 100 may determine whether the type of the detected object is the bicycle 4 or not (610), and when it is determined that the object is the bicycle 4, the controller 100 may determine a detection target area about the bicycle 4 (620). Particularly, when the bicycle 4 moves in the longitudinal direction, the controller 100 may determine the first detection area (A1) as a detection target area, based on the speed of longitudinal movement ($V_{4L}$) and the longitudinal moving distance of the bicycle 4. In addition, when the bicycle 4 moves in the transverse direction, the controller 100 may determine the third detection area (A3) as a detection target area, based on the speed of transverse movement ($V_{4w}$) and the transverse moving distance of the bicycle 4.

The controller 100 may calculate the TTC between the vehicle 1 and the bicycle 4 based on at least one of position information and speed information of the bicycle 4 that is detected in the determined detection target area (630). As mentioned in FIG. 12, the TTC between the vehicle 1 and the bicycle 4 may be changed according to the position and driving speed of the bicycle 4.

The controller 100 may determine an amount of deceleration of the vehicle 1 based on the calculated TTC between the vehicle 1 and the bicycle 4 (640), wherein the amount of deceleration may be great as the TTC is shorter, and the amount of deceleration may be less as the TTC is longer.

The controller 100 may transmit a control signal configured to control the speed regulator 70 so that the driving speed of the vehicle 1 is reduced based on the determined amount of deceleration (650) and then the driving speed of the vehicle 1 may be regulated in response to the transmitted control signal.

According to the vehicle 1 and the method for controlling the vehicle 1 according to the embodiment of the present disclosure, the case in which the object includes the target vehicle 2, the pedestrian 3 and the bicycle 4 has been illustrated as an example, but the type of the object is not limited thereto. Therefore, the object may include any kind of subject as long as being detected in the front of the vehicle 1.

The disclosed embodiments may be implemented in the form of a recording medium that stores instructions executable by a computer. The instructions may be stored in the form of program code and may perform the operations of the embodiments disclosed by creating a program module when executed by a processor. The recording medium may be implemented in a computer-readable recording medium.

The computer readable recording medium may include various kinds of recording medium in which an instruction decrypted by the computer system is stored. For example, the computer readable recording medium may include a Read Only Memory (ROM), a Random Access Memory (RAM), a magnetic tape, a magnetic disk, a flash memory, and an optical data storage device.

As is apparent from the above description, according to the proposed vehicle and method for controlling thereof, it may be possible to reduce controlled variables for detecting an object in an area, in which the object is not present, by variably setting an area, which is configured to detect the object for avoiding a collision between a vehicle and the object, according to the type of the object.

In addition, it may be possible to secure the safety by avoiding the collision according to the risk of collision between the vehicle and the object placed in the set detection area.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A vehicle comprising:
an image capturer configured to detect an object by capturing the object around a vehicle;
a sensor configured to acquire at least one of position information or speed information of the object;

a controller configured to variably determine a detection target area based on a type of the detected object, configured to calculate a time to collision (TTC) between the vehicle and the object based on the at least one of position information or speed information of the object located in the variably determined detection target area, and configured to transmit a signal to control a driving speed of the vehicle based on the calculated TTC; and a speed regulator configured to regulate the driving speed of the vehicle in response to the transmitted control signal, wherein the controller is configured to determine an area of the detection target area based on at least one of a speed of lateral movement of the object or a speed of longitudinal movement of the object based on the type of the detected object.

2. The vehicle of claim 1, wherein
the controller determines the detection target area based on at least one of a speed of lateral movement or a speed of longitudinal movement based on the type of the detected object.

3. The vehicle of claim 1, wherein
the controller calculates the TTC between the vehicle and the object based on the at least one of position information or speed information of the object located in the determined detection target area.

4. The vehicle of claim 3, wherein
the controller calculates the TTC between the vehicle and the object based on at least one of the speed of lateral movement or the speed of longitudinal movement of the object located in the determined detection target area.

5. The vehicle of claim 1, wherein
the controller determines an amount of deceleration of the vehicle based on the calculated TTC.

6. The vehicle of claim 5, wherein
the controller controls the speed regulator so that the driving speed of the vehicle is reduced based on the determined amount of deceleration of the vehicle.

7. The vehicle of claim 1, wherein
the object comprises at least one of a target vehicle, a pedestrian or a bicycle located in front of the vehicle.

8. The vehicle of claim 1, wherein
the sensor comprises any one of a radar and a Light Detection And Ranging (LiDAR).

9. A method for controlling a vehicle comprising:
detecting an object around a vehicle;
variably determining a detection target area based on a type of the detected object;
calculating-a time to collision (TTC) between the vehicle and the object based on at least one of position information or speed information of the object located in the variably determined detection target area;
transmitting a signal to control a driving speed of the vehicle based on the calculated TTC; and
regulating the driving speed of the vehicle in response to the transmitted control signal,
wherein the variably determining of the detection target area comprises determining an area of the detection target area based on at least one of a speed of lateral movement of the object or a speed of longitudinal movement of the object based on the type of the detected object.

10. The method of claim 9, wherein
the determination of the detection target area comprises determining the detection target area based on at least one of a speed of lateral movement or a speed of longitudinal movement based on the type of the detected object.

11. The method of claim 9, wherein
the calculation of the TTC between the vehicle and the object comprises calculating a TTC between the vehicle and the object based on the at least one of position information or speed information of the object located in the determined detection target area.

12. The method of claim 11, wherein
the calculation of the TTC between the vehicle and the object comprises calculating a TTC between the vehicle and the object based on at least one of the speed of lateral movement or the speed of longitudinal movement the object located in the determined detection target area.

13. The method of claim 9, wherein
the control of the driving speed of the vehicle comprises determining an amount of deceleration of the vehicle based on the calculated TTC.

14. The method of claim 13, wherein
the control of the driving speed of the vehicle comprises allowing the driving speed of the vehicle to be reduced based on the determined amount of deceleration of the vehicle.

* * * * *